(12) United States Patent
Steinich

(10) Patent No.: US 6,347,462 B1
(45) Date of Patent: *Feb. 19, 2002

(54) MEASURING CABLE TRAVEL SENSOR WITH HOUSING

(75) Inventor: Klaus-Manfred Steinich, Poering (DE)

(73) Assignee: ASM Automation Sensorik Messtechnik GmbH, Unterhaching (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/359,590

(22) Filed: Jul. 26, 1999

(30) Foreign Application Priority Data

Aug. 27, 1998 (DE) .......................................... 198 39 027

(51) Int. Cl.[7] .................................................. G01B 3/10
(52) U.S. Cl. ............................... 33/756; 33/755; 33/762
(58) Field of Search ................................ 33/1 PT, 755, 33/756, 762, 763, 733, 769, 761

(56) References Cited

U.S. PATENT DOCUMENTS

| 3,780,440 | A | * | 12/1973 | Taylor .......................... 33/756 |
| 4,130,940 | A | * | 12/1978 | Densmore ..................... 33/756 |
| 4,235,419 | A | * | 11/1980 | Schuck ....................... 191/12 R |
| 4,366,623 | A | * | 1/1983 | Bergvist ....................... 33/763 |
| 4,500,048 | A | * | 2/1985 | Schaller ..................... 242/107.3 |
| 5,761,822 | A | * | 6/1998 | Steinich ........................ 33/756 |
| 6,154,975 | A | * | 12/2000 | Steinich ........................ 33/756 |
| 6,168,107 | B1 | * | 1/2001 | Bishop et al. ................. 33/756 |

FOREIGN PATENT DOCUMENTS

| DE | 88 01 109 | 7/1988 |
| DE | 42 07 247 | 9/1993 |
| DE | 297 07 253 | 8/1997 |

* cited by examiner

Primary Examiner—Diego Gutierrez
Assistant Examiner—Madeline Gonzalez
(74) Attorney, Agent, or Firm—Jacobson Holman, PLLC

(57) ABSTRACT

A measuring cable travel sensor includes a housing accommodating a rotatable cable drum for winding a measuring cable on to and off same, and a spring for urging the cable drum in the winding-on direction. A rotary angle sensor is operatively associated with the cable drum. The housing at least partially includes a straight profile portion which is of uniform cross-section in its longitudinal direction. The spring can also be disposed in a spring casing portion substantially including a straight profile portion of uniform cross-section in its longitudinal direction.

63 Claims, 26 Drawing Sheets

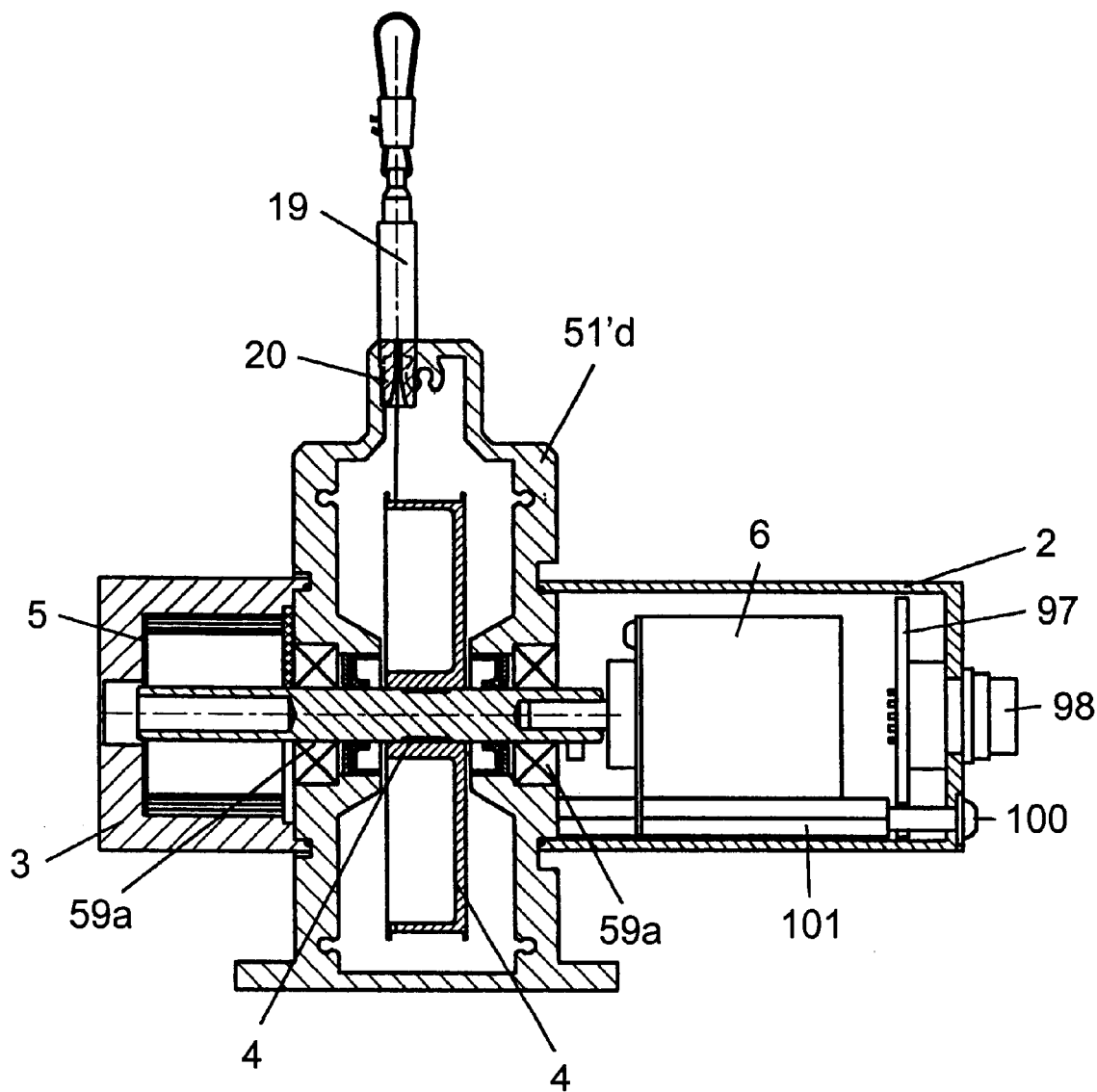

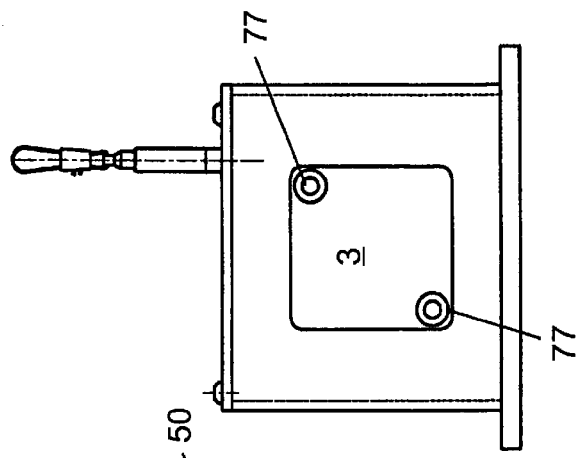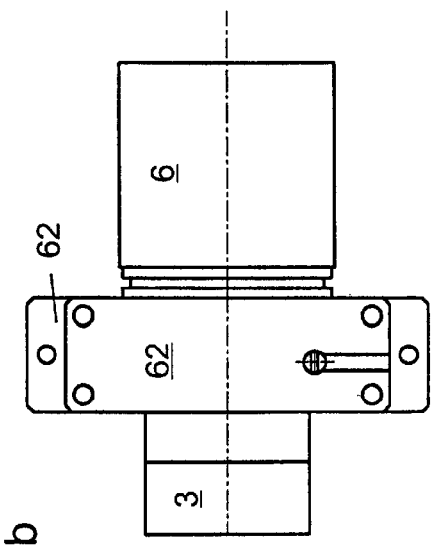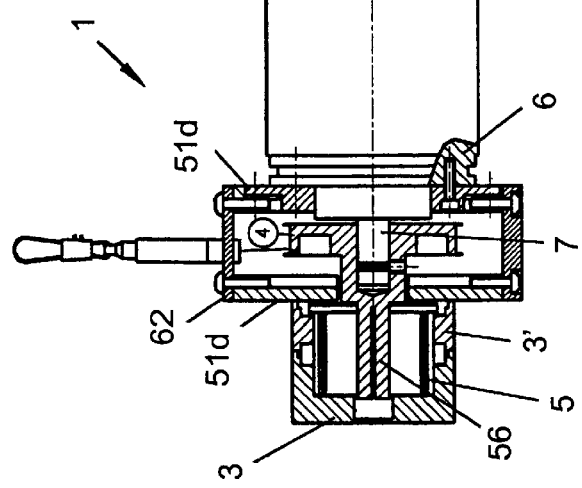

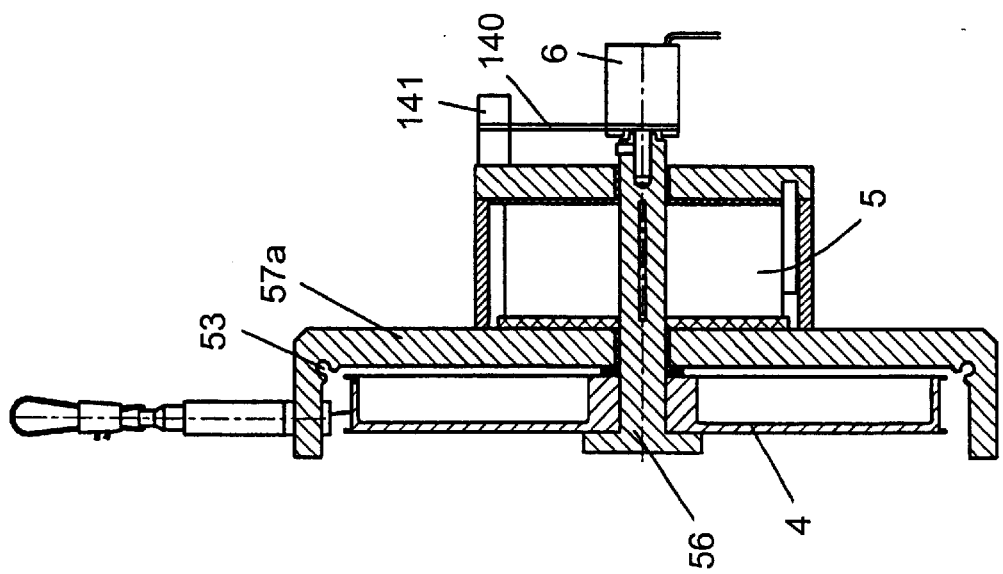
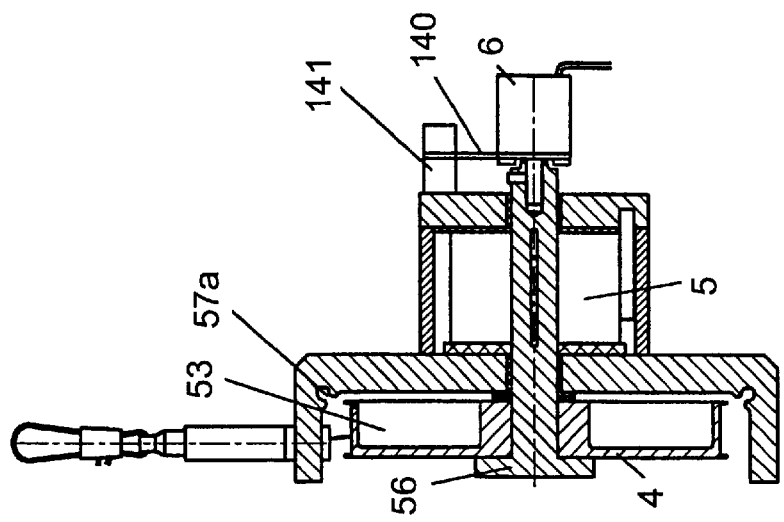

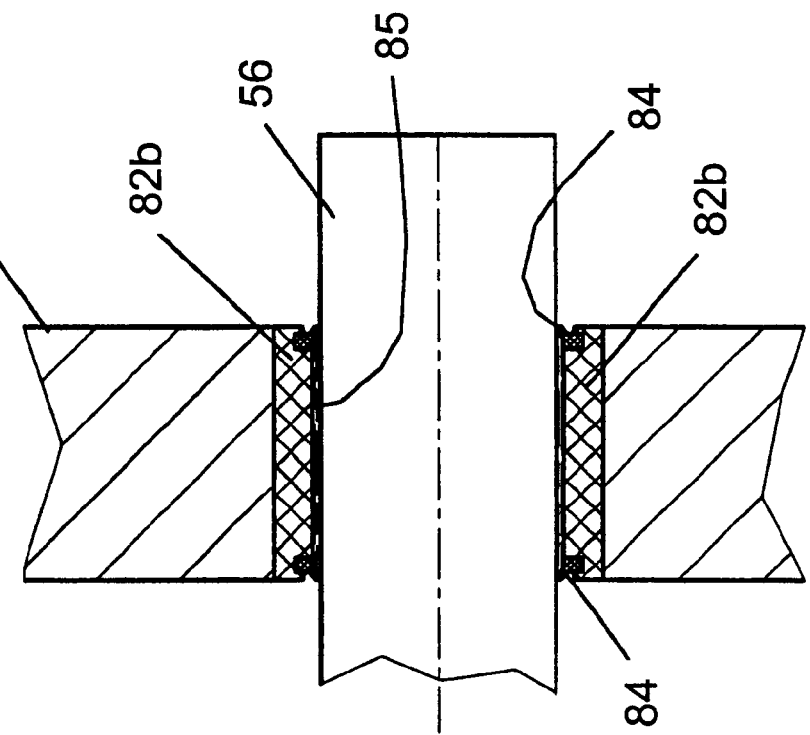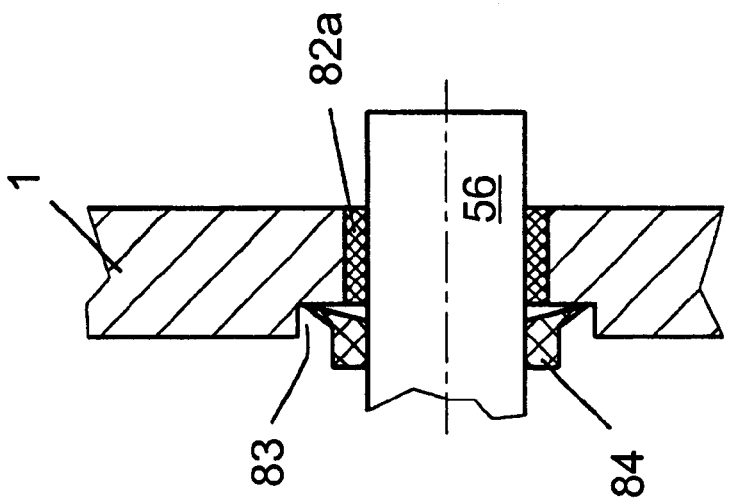

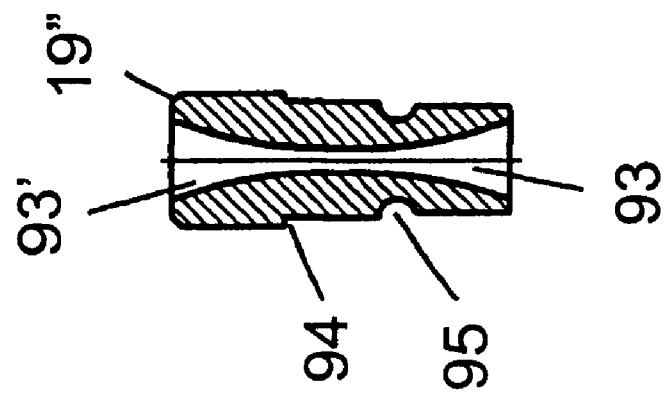
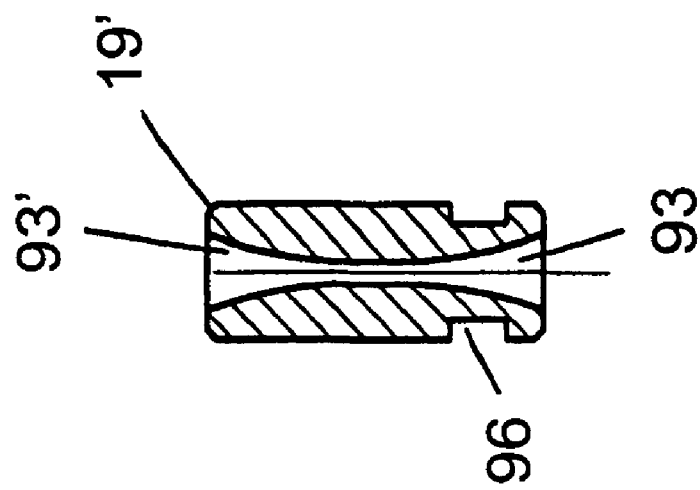

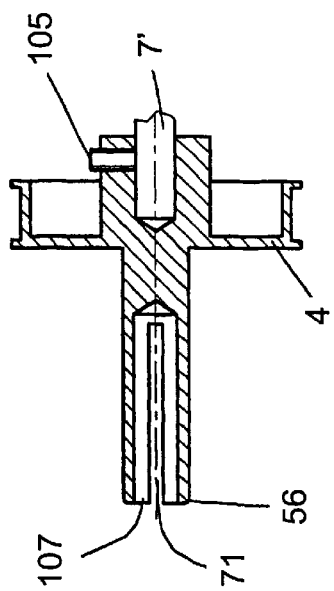
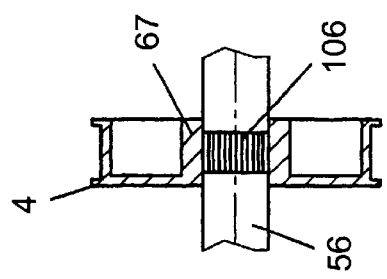
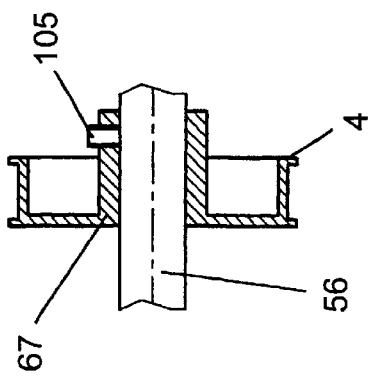

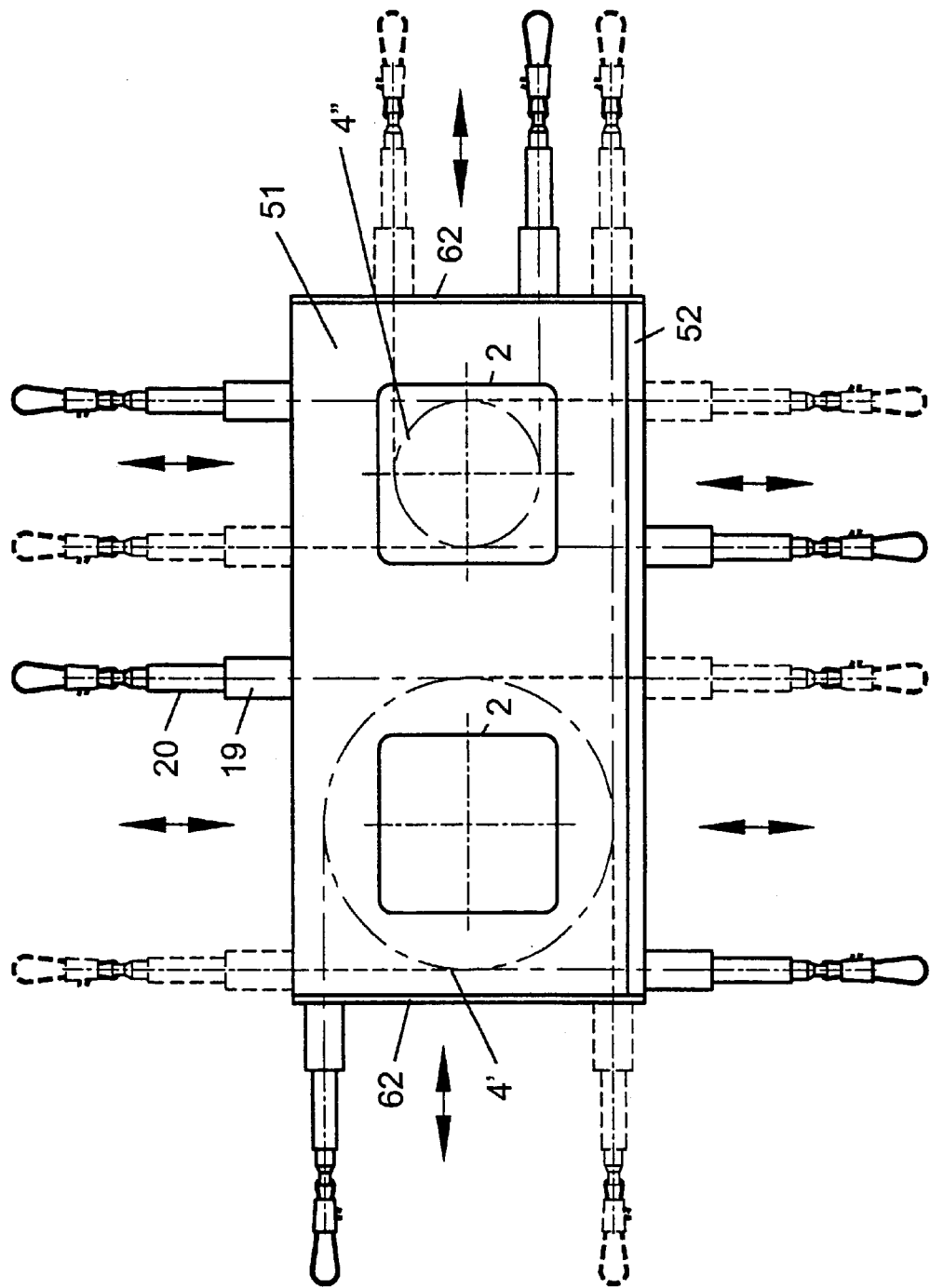

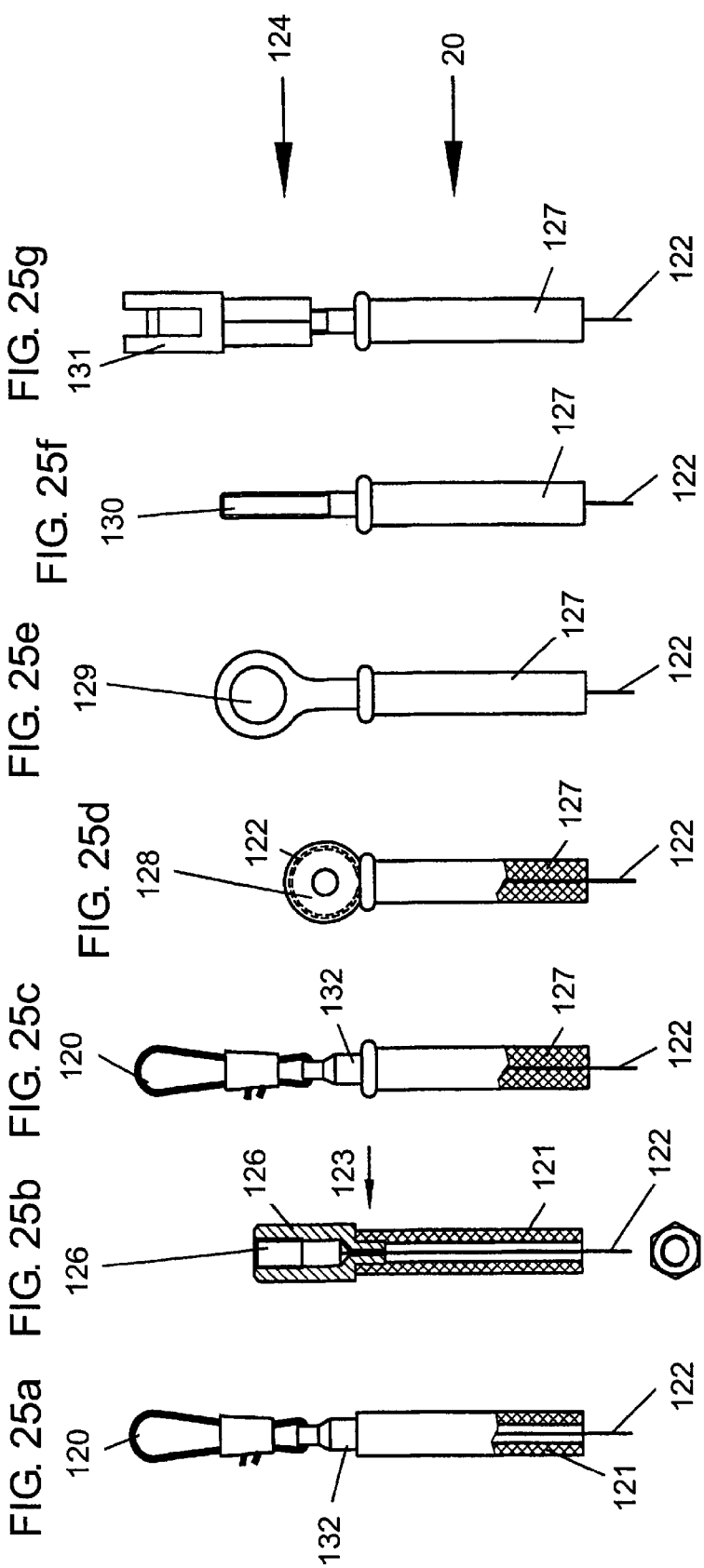

MEASURING CABLE TRAVEL SENSOR WITH HOUSING

FIELD OF THE INVENTION

The invention concerns a measuring cable travel sensor and more particularly a measuring cable travel sensor with housing.

BACKGROUND OF THE INVENTION

Measuring cable travel sensors are travel or distance-measuring sensors which operate on the principle of a measuring cable, with a housing which is suitable for use in industrial situations. A typical travel sensor of that kind comprises a precisely defined and positioned cable drum on to which a measuring cable is wound, generally only in a single layer on the drum, with one end of the measuring cable being suitably fixed to the cable drum. The other free end of the measuring cable is secured to that body or article, the variation in the position of which is to be precisely measured.

When the movable body or article moves away from or towards the cable drum of the measuring cable travel sensor, the resulting angular movements of the measuring cable drum about its axis are converted into a precise travel or distance length by means of a rotary angle sensor which is non-rotatably coupled to the cable drum. A rotary torsion spring which is operatively connected to the cable drum, generally in coaxial relationship therewith, ensures that the measuring cable is wound on to the cable drum again when the movable body whose position is to be measured moves towards the cable drum, thereby to ensure that the measuring cable is properly wound on to the drum and is kept in a reasonably taut condition.

The housing for a typical measuring cable travel sensor of such a kind which in particular has receiving regions for accommodating the cable drum and the spring is assembled from individual parts, in particular by screw means. The one individual part provides a receiving region for accommodating the spring, a further part provides a receiving region for accommodating the cable drum and there is possibly yet a further part which provides a receiving region for the rotary angle sensor. The individual parts constituting the housing of the measuring cable travel sensor of such a configuration are generally produced more particularly from light metal or alloy by a die casting process and subjected to finishing machining by procedures such as milling and boring, but they may also be produced from the solid by cutting machining. The parts constituting the housing can also be produced by deep drawing.

It has been found however that housings of that nature suffer from a number of specific disadvantages according to the respective mode of manufacture involved.

Thus for example all forms of housing which are produced by means of an initial shaping mold as is the case for example with die casting or deep drawing are an economical proposition only when relatively large numbers of housings are produced.

On the other hand housing parts which are produced for example by milling from solid material are uniformly expensive in regard to individual item price.

SUMMARY OF THE INVENTION

An object of the present invention is to provide a measuring cable travel sensor whose parts and in particular the parts of the housing thereof can be easily and inexpensively produced.

Another object of the present invention is to provide a measuring cable travel sensor in which in particular moving parts of the sensor and more especially the cable drum thereof are to be of the lowest viable inertial mass.

Still another object of the present invention is to provide a measuring cable travel sensor having a housing which can be produced in a compact and robust design configuration by a simple operating procedure.

Yet another object of the present invention is to afford a measuring cable travel sensor having a housing whose design configuration is such as to provide a highly advantageous relationship between quality and price by suitable selection of the material involved and the operating procedure applied thereto.

Still a further object of the present invention is to provide a measuring cable travel sensor which is so designed that assembly thereof is a readily implementable procedure.

In accordance with the principles of the present invention the foregoing and other objects are attained by a measuring cable travel sensor comprising a housing accommodating a measuring cable drum and a rotary spring for urging the cable drum in the cable winding-on direction. A rotary angle sensor is mounted to the housing. The housing at least partially comprises a straight profile portion with a cross-section which is uniform in the longitudinal direction.

As will be appreciated from the description hereinafter in greater detail of preferred embodiments of the present invention, the fact that the measuring cable travel sensor is at least partially manufactured from straight profile portions which are not produced in the required length directly from manufacture, it is possible to use inexpensive extruded profile portions which then only have to be cut to the desired length in order to serve as a portion of the housing or as a part of the cable drum.

The profile portion may include integrated longitudinal grooves of an undercut configuration, whereby it is further possible for covers to be fixed on the open sides of the profile portions by means of self-tapping screws, without requiring further preliminary preparation or machining thereof. Thus the only preliminary preparation operation is that of providing openings on the appropriate profile portion for fitting therethrough the shaft of the measuring cable travel sensor, which carries the rotary members thereof.

It is possible in that way to produce a compact robust housing at low cost, while in addition the relationship between price and quality can also be influenced by the choice of the material used, in particular involving a selection between plastic material and light metal or alloy.

It will be noted in that respect that it is possible to use different profile shapes for the housing, for example either open profile shapes such as a plate profile, an L-shaped profile or a C-shaped profile, or closed profile shapes such as a box profile or a double-box profile. When the open profile shapes are adopted, the cable drum is arranged parallel to one of the main limbs or sides of the profile shape, the shaft carrying the cable drum passing through that limb. More particularly in that case the cable drum is disposed in the free space defined within a C-shaped profile or in the free space between the legs of an L-shaped profile. In such a case the cable drum on the one hand and the rotary spring on the other hand, and possibly additionally also the rotary angle sensor on the other hand, may be disposed in respective separate housing portions which can be releasably fixed to each other, more particularly by screw means.

In particular upon assembly of the rotary spring which is generally a shaped flat spring wound in a spiral configuration in one plane, the procedure involved is such that the spring is on the one hand non-rotatably connected to the shaft and on the other hand fixedly connected to the housing, and the part of the housing which accommodates the spring, which can be referred to hereinafter as the spring shell portion of the housing, is then turned relative to the other parts of the housing, about the shaft, until the spring is in its prestressed condition. It is only then that the spring shell portion constituting part of the housing is connected to the other parts of the housing as for example by screw means or in some other suitable fashion.

When box profile portions are used, on the one hand the spring and on the other hand the cable drum can each be disposed in a respective box profile portion, while in some cases the rotary angle sensor can also be disposed in a further box profile portion. In that case the three box profile portions constituting the housing can be connected directly or indirectly by means of longitudinal covers which engage thereover and which are secured for example by screw means to all three profile portions.

When the housing is made up at least in part by the use of a multiple-box profile portion such as for example a double-box profile portion, the spring on the one hand and the cable drum on the other hand are disposed in respective ones of the cavities defined by the box profile, while the rotary angle sensor can possibly be disposed in a third cavity in the profile portion.

In a preferred feature of the invention the axial direction of the shaft which connects the rotary parts of the sensor extends transversely with respect to the longitudinal direction of the profile portion and passes through its main limb which can involve an increased wall thickness or gauge in comparison with secondary limbs, for mounting plain or rolling bearings. In addition in a further preferred feature the profile portions can be provided with integral base plates which project laterally outwardly at least on one side and which serve to connect the measuring cable travel sensor to other components, for example of a structure on which the measuring cable travel sensor is to be mounted.

For the purposes of appropriately distributing the movable masses of the assembly, the spring on the one hand and the rotary angle sensor on the other hand can be disposed on mutually opposite sides of the cable drum. Another option in this respect is for the spring to be disposed between the rotary angle sensor and the cable drum, and this structure is preferred in particular in relation to uses in which the receiving region for accommodating the cable drum does not have to be closed off, by virtue of the measuring cable travel sensor being employed in a clean environment. In that way it is possible for the cable drum to be arranged on the one side of the main limb of an open profile while the spring can be arranged on the other side of the main limb. It will be seen therefore that the main limb of the open profile represents the load-bearing function of the housing.

In this case also, in accordance with a further feature, the rotary angle sensor, irrespective of the end of the shaft at which it is arranged, is to be prevented from being entrained in a rotational movement with the cable drum, by way of a torque-resistant support means.

The above-mentioned grooves of an undercut configuration can serve on the one hand for screwing longitudinal covers in position by means of self-tapping screws, but they can also provide for the insertion of boards with electronic circuits and components in the longitudinal direction, something which is possible in particular when the longitudinal grooves are arranged in mutually opposite paired relationship in the case of a profile portion having two limbs which extend parallel to each other.

Intermediate angle portions for mounting further components, for example a brake for the cable drum and so forth, can also be easily fixed by screw means in the longitudinal grooves.

In that respect, a brake on the cable drum and/or the spring is intended to operate in particular only in the measuring cable winding-on direction, and is appropriate and meaningful for those situations of use in which winding-on of the measuring cable can take place so quickly that it would be possible for the measuring cable not to wind on to the cable drum in the correct layered and dense configuration thereon, by virtue of the winding-on speed being excessively high.

In accordance with a preferred feature of the invention the brake may be a fluid brake, operable for example with air or with a suitable liquid, an eddy current brake or a magnetic brake, but preferably always being a brake which does not suffer from wear, thereby to afford enhanced freedom from maintenance requirements.

In an equally simple and inexpensive manner to the housing being at least partially formed from a straight profile portion, the cable drum itself may also at least partially comprise a profile portion. It is to be noted in that respect that the cable drum is to be of the minimum viable inertial mass.

More particularly the winding surface of the cable drum, on to which the measuring cable is wound and from which it is unwound, may comprise a part of a round tubular profile portion, with a central hub to which that part of the tubular profile portion can be connected for example by way of spokes which thus afford a low mass. In that arrangement, the spokes can be formed together with the winding surface and the hub in an integral structure in the form of a special profile portion, the longitudinal direction of which corresponds to the axis of rotation of the cable drum.

It is however also possible for the connection between the winding surface and the hub of the cable drum to be implemented by way of the check or end guide disks which are necessary in any case and which project radially beyond the winding surface, in which respect the central bore in the disks, possibly supplemented by means of spacer elements between the disks, can be sufficient to act as the hub. In order to ensure good dimensional accuracy of the cable drum and to preclude distortion upon assembly thereof, the individual parts making up the cable drum are preferably assembled by adhesive means or by means of positively locking sheet bending connecting means. depending on whether the cable drum comprises sheet metal or plastic material. Combinations of individual parts of different materials are also possible in that respect.

Further objects, features and advantages of the invention will be apparent from the description hereinafter of preferred embodiments thereof.

BRIEF DESCRIPTION OF THE DRAWING

FIGS. 3a–c show other structures with a box profile portion, FIGS. 4a–c show a measuring cable travel sensor once again with a box profile portion, FIGS. 7a–c show other embodiments involving a C-shaped profile portion, FIGS. 8a and b show separate double-box profile portions, FIGS. 9a and b show separate box profile portions, FIGS. 10a and b show separate C-shaped profile portions, FIGS. 11a and b show separate L-shaped profile portions, FIGS. 18a–c show detail views of the connection between the cable drum shaft and the cable drum, FIG. 24 is a diagrammatic view of a double housing of an embodiment of the invention, and FIG. 25 shows views of various cable end connections.

DESCRIPTION OF PREFERRED EMBODIMENTS

Figure 1A:
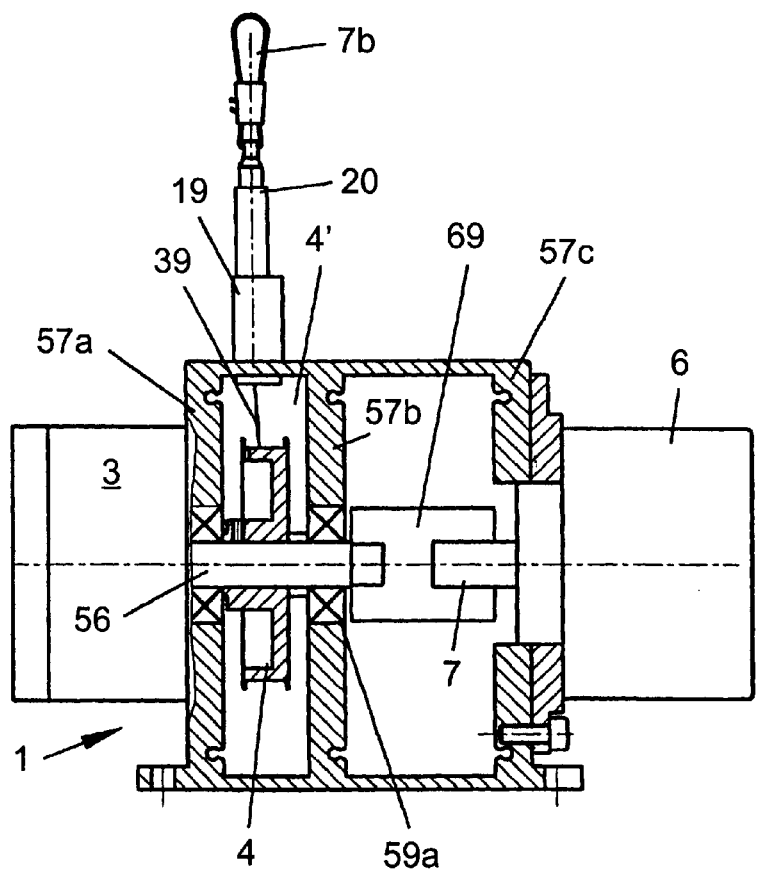
FIGS. 1a and 1b show a measuring cable travel sensor including a double-box profile portion, this constituting one of the best modes of the invention.
Figure 1B:
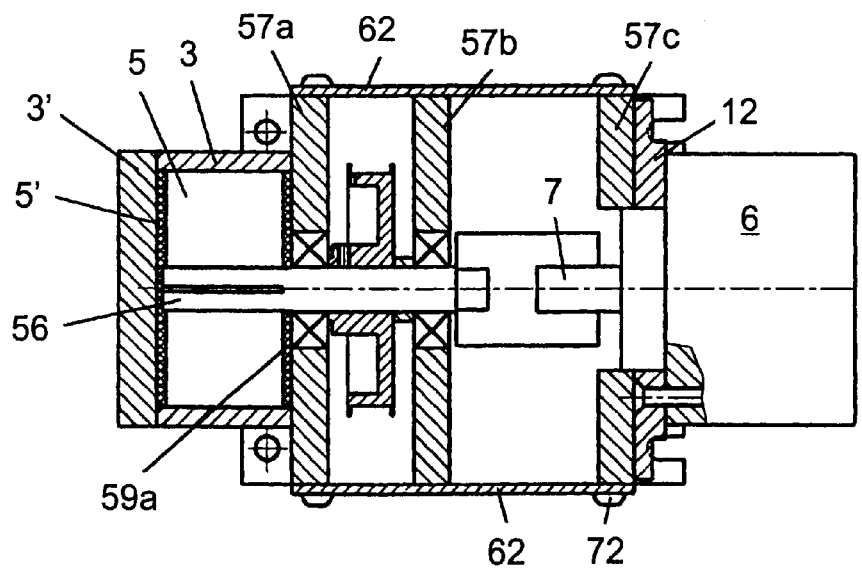

Referring firstly to FIGS. 1a and 1b, shown therein as a side view and a plan view is a measuring cable travel sensor according to the invention, in relation to which the core part thereof for the purposes of the present invention, more specifically the housing 1 thereof, at least partially comprises a straight profile of a cross-section which is uniform in the longitudinal direction, more specifically being a double-box profile as indicated generally at 51e. The profile portion thus defines first and second chambers in mutually juxtaposed relationship, wherein disposed in one of the chambers is a rotatably mounted cable drum 4 on to and from which in operation of the measuring cable travel sensor a cable which is not illustrated specifically but which is indicated by a line 39 in FIG. 1a is wound and unwound. One end of the cable is fixed on the cable drum 4 while the other end thereof which is thus the free end carries a suitable connector such as a carabiner or snap hook 7b for fixing to a movable body or article, the position or movement of which is to be monitored and sensed.

The cable drum 4 is non-rotatably supported on a shaft 56 which is in turn rotatably mounted by means of ball bearings 59a on the one hand in the central main limb 57b of the box profile configuration and on the other hand in an outer main limb 57a thereof. The shaft 56 extends outwardly beyond the main limb 57a which forms the outer wall and which delimits a chamber of the double-box profile portion, said chamber forming the receiving region 4' for accommodating the cable drum 4. As shown in FIG. 1b, a rotary torsion spring 5 is rotatably fixed with its one end on that freely outwardly projecting end portion of the shaft 56, by virtue of the end of the spring 5 being inserted into a spring slot 51 provided in the end portion of the shaft 56. The spring 5 is protected by a separate housing in the form of a cup-shaped housing portion 3, referred to herein as the spring shell portion 3, which is fitted with its open side over the spring 5 and joined by suitable connecting means such as more particularly screws to the outside surface of the main limb 57a of the double-box profile portion 51e.

In that arrangement, the outwardly disposed free end of the rotary spring 5 which extends generally in a spiral configuration is fixed non-rotatably, in particular by virtue of positively locking engagement, in the interior of the spring shell portion 3, so that the spring 5 can be tightened up by turning the spring shell portion 3 relative to the remainder of the housing, before the spring shell portion 3 is secured by screw means to the double-box profile portion.

The shaft 56 also extends on the other side beyond the first chamber which therefore constitutes the above-mentioned receiving region 4' for accommodating the cable drum 4, into the second chamber of the double-box profile portion 51e. There, arranged on that free end portion of the shaft 56 is a coupling 69 for connection to a trunnion portion 7 forming the projecting end part of a rotary angle sensor 6. The rotary angle sensor 6 is mounted on the outside surface of the double-box profile portion 51e, which is remote from the spring 5, and the trunnion portion 7 projects into the adjoining chamber of the profile portion, for connection to the coupling 69 which is intended to compensate for slight angular displacement and/or axial displacement between the rotary angle sensor 6 on the one hand and the shaft 56 which carries the cable drum 4 and the spring 5.

In this arrangement, as can best be seen from FIG. 1b, the rotary angle sensor 6 is fixed in position to the housing by means of an adaptor ring 12 which is firstly screwed to the rotary angle sensor 6 and which projects radially outwardly therebeyond. so that then, at that radially outwardly projecting portion, the adaptor ring 12 can be screwed to the outer main limb 57c of the double-box profile portion 51e.

As can best be seen from FIG. 1b also, the main limbs 57a, 57b, 57c must be bored therethrough perpendicularly to their longitudinal extent in order to afford through openings for the shaft 56 and the bearings 59a thereof and at least the trunnion portion 7 of the shaft of the rotary angle sensor 6. As FIG. 1b shows, the opening in the main limb 57c is larger than the trunnion portion 7, more specifically being of such a size that a centering collar portion 8 which does not rotate with the trunnion portion 7 but which is disposed fixedly on the rotary angle sensor 6 fits into the through opening in the main limb 57c, whereby the precise position of the rotary angle sensor 6 relative to the double-box profile portion 51e is fixedly established.

FIG. 1b also shows closure of the ends of the double-box profile portion 51e by means of longitudinal covers indicated at 62, which are fixed for example by screw means to the double-box profile portion 51e, by cover-fixing screws 72 being directly screwed into longitudinal grooves 53 which are of a generally undercut configuration and which are provided on the inside surfaces of the double-box profile portion 51, for which reason self-tapping screws will generally be employed as the cover-fixing screws 72.

As FIG. 1a shows, the double-box profile portion 51e additionally has a prolongation of the lower horizontal secondary limb 58 projecting outwardly beyond the actual box profile configuration, in the form of base plates 52, by means of which the measuring cable travel sensor as a unit can be screwed to a component for supporting it.

To appreciate the structure of the housing of the measuring cable travel sensor described above, reference will now be made to FIGS. 8a and 8b showing views of double-box profile portions 51e similar to the double-box profile portion 51e shown in FIGS. 1a and 1b, as separate components.

Figure 8A:
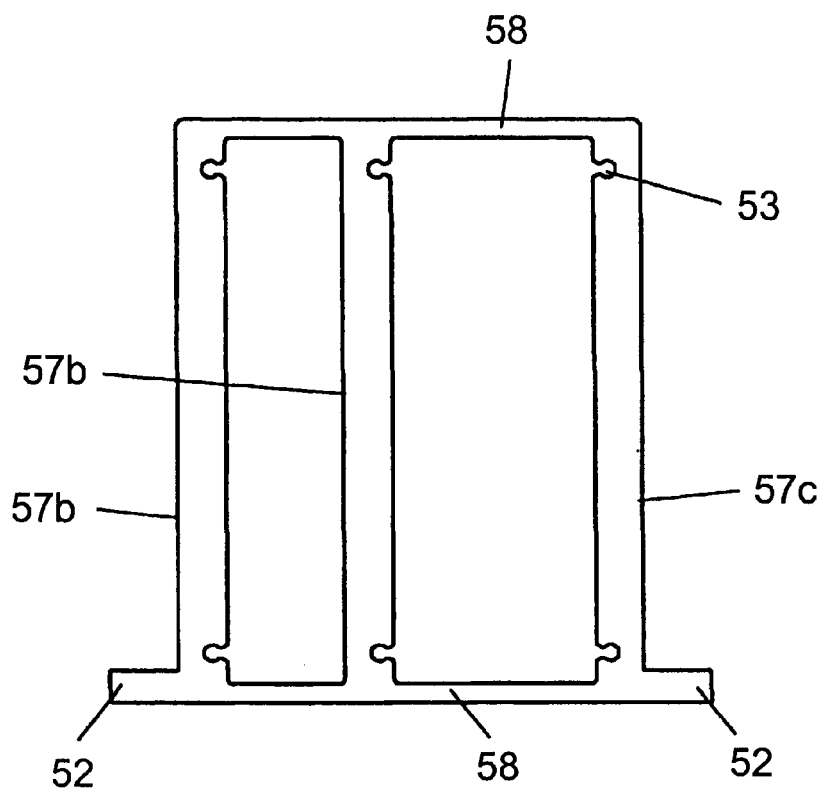
Figure 8B:
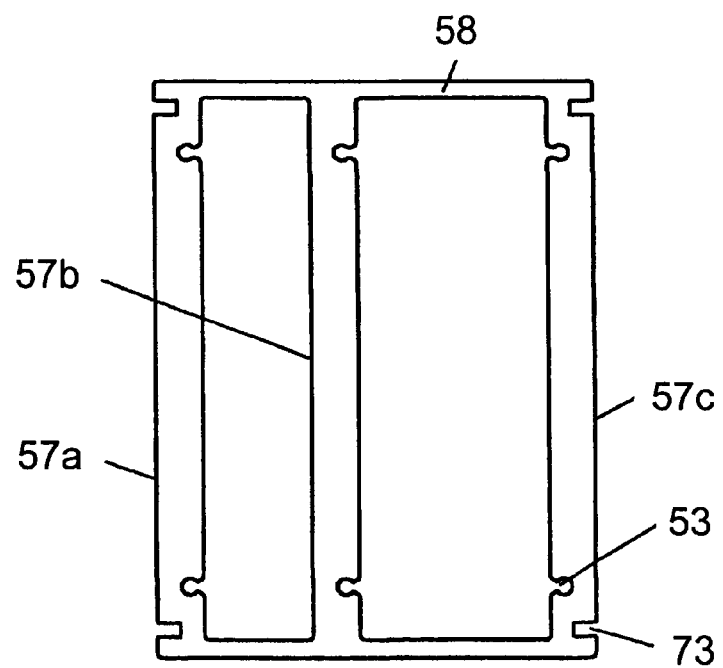

In the structures shown in FIGS. 8a and 8b however the main limbs 57a–57c, in contrast to those shown in FIGS. 1a and 1b, are of a uniform relatively thick cross-section over their entire height. That cross-section is sufficient for for example ball bearings 59a to be accommodated therein for supporting the shaft 56, after suitable bores have been formed in the main limbs 57a–57c and extending therethrough.

In that respect the thickness of the main limbs 57a, 57b and 57c is about three times as great as the thickness of the horizontal secondary limbs 58 which are at a right angle thereto.

In a corresponding fashion the longitudinal grooves indicated at 53 which are of an undercut configuration and which primarily serve for mounting longitudinal covers indicated at 62 in for example FIG. 1b in place by suitable screw means are provided in the main limbs 57a, 57b and 57c, more specifically on the outer main limbs 57a and 57c at the inward sides thereof. The longitudinal grooves 53 are of an Ω-shape so that the part of an undercut configuration is of a very substantially round contour in order to be able to offer screwthread engagement over the largest possible part of its periphery for a self-tapping screw which is screwed therein.

It will be noted at this point that the profile portions illustrated in FIGS. 8 through 11 are profile portions whose cross-sectional shape, including the longitudinal grooves 53, does not change in the direction of view, that is to say in regard to depth in FIGS. 8 through 11, and which extend in a straight direction, and they can therefore also be produced for example in the form of an extruded profile portion from plastic material or light metal or alloy.

Referring still to FIGS. 8a and 8b, these Figures also show that particularly in the right-hand chamber therein in which the coupling indicated at 69 in FIG. 1a is subsequently to be disposed, the longitudinal grooves 53 in the main limbs 57b, 57c which define that chamber are arranged in mutually opposite paired relationship. In that way those longitudinal grooves 53 can also be used for the positively locking insertion of boards carrying electronic circuitry, whereby the free space outside the relatively slender coupling 69 can additionally be utilised for arranging evaluation electronics therein. While the double-box profile in FIG. 8a has the integral base plates 52 which project laterally on both sides and the wall thickness of which is between the wall thickness of the main limbs 57 and the wall thickness of the limbs 58, the structure shown in FIG. 8b does not have any base plates of that kind. In contrast, the embodiment of FIG. 8b is fixed by way of clamping grooves 73 which are provided in mutually opposite paired relationship on the outsides of the outer main limbs 57a, 57c in the proximity of the end regions thereof and into which can project the protruding noses of fixing members which are screwed to another component on which the housing of FIG. 8b is to be mounted.

Figure 2A:
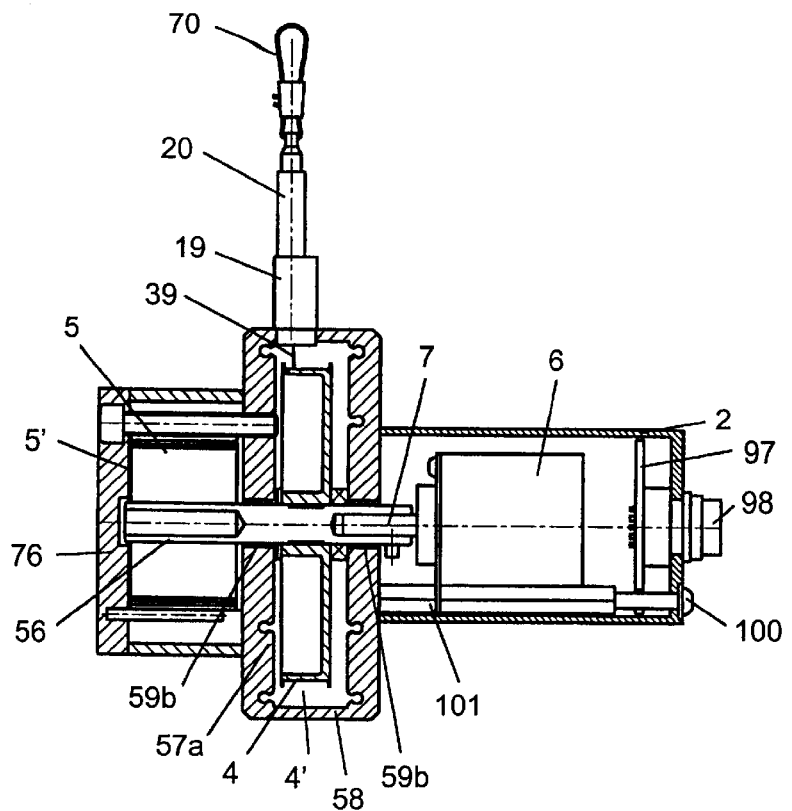
FIGS. 2a and 2b show a measuring cable travel sensor including a box profile portion, constituting another best mode of the invention.
Figure 2B:
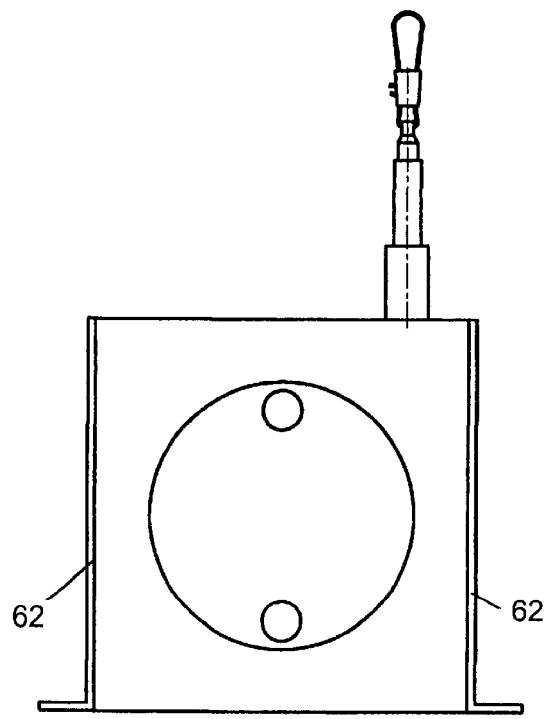

Reference will now go back to FIGS. 2a and 2b showing a side view and a front view of another embodiment of a measuring cable travel sensor in which the core part of the housing thereof comprises a box profile portion generally indicated at 51d, with only one chamber therewithin, serving as a receiving region 4' for accommodating the cable drum 4.

Having regard to the general similarity between the embodiment shown in FIGS. 1a and b and the embodiment shown in FIGS. 2a and b, details of the structure in FIGS. 2a and b which are the same as those in FIGS. 1a and b will not be described fully at this point, but the following description relating to FIGS. 2a and b will concentrate on the differences therein.

Thus, on the one hand, the connection between the trunnion portion 7 of the shaft of the rotary angle sensor 6 and the shaft 56 of the cable drum 4 is not disposed in a separate chamber defined by a part of the profile portion 51d, but rather the shaft 56 is of such a size that the trunnion portion 7 is directly inserted into a longitudinal bore in the one end part of the shaft 56 and is non-rotatably connected thereto by means of a clamping screw 74. That therefore precludes angular displacement between the rotary angle sensor 6 and the shaft 56. The rotary angle sensor 6 is only prevented from rotating by way of a torque-resistant support 75 which comprises a metal plate extending transversely with respect to the axial direction of the shaft 56 and also the shaft of the rotary angle sensor 6 and which is screwed together with the cup-shaped sensor shell portion 2 surrounding the rotary angle sensor 6 as a casing for same, on the outside of the box profile portion 51d.

A further difference is that the rotary spring 5 is protected by a housing which on the one hand comprises a part of a round tubular profile portion 51f which surrounds the spring 5 and which is closed at the free end thereof by a spring cover 76 which serves at the same time as a mounting or bearing plate. The spring cover 76 is screwed to the box profile portion 51d by way of screws which extend into the main limb 57a thereof.

Figure 9A:
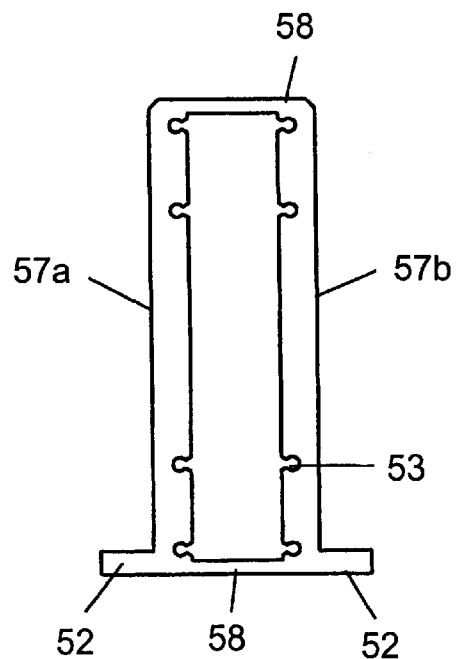
Figure 9B:
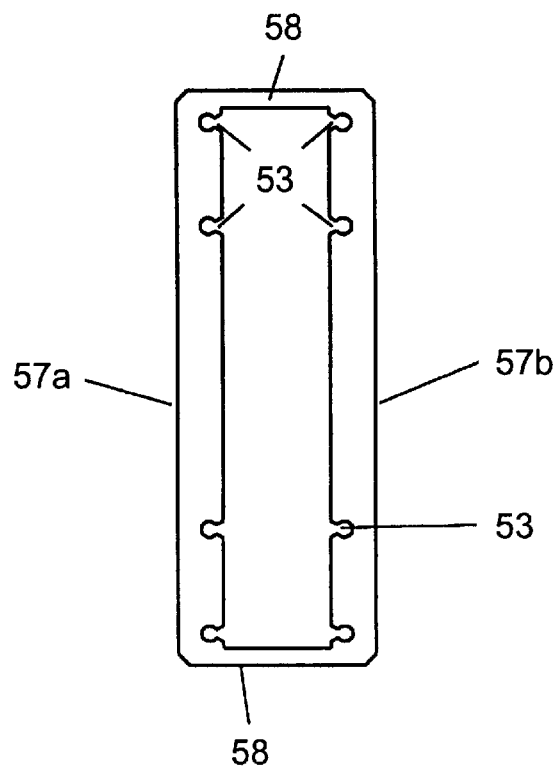

The box profile portion 51d of FIGS. 2a and b is shown as a separate component in FIG. 9b. In this case, longitudinal grooves 53 are provided once again in opposite paired relationship in the main limbs 57a, 57b which are again of a larger wall thickness than the secondary limbs 58 connecting them at a right angle with respect thereto. A respective longitudinal groove is provided in the proximity of respective corner regions, while a further pair of longitudinal grooves is provided at positions somewhat further towards the longitudinal center of the limbs 57a, 57b.

As the embodiment shown in FIGS. 2a and 2b uses a box profile portion 51d without laterally projecting base plates 52, L-shaped profile portions are used as the longitudinal covers 62 which are shown in FIG. 2b. The L-shaped profile portions each have a first limb closing the associated open end of the box profile portion 51d, while the other limbs of the L-shaped profile portions serve in laterally projecting relationship for fixing the measuring cable travel sensor to another component to which it is to be mounted, similarly to the function performed by the base plates 52 which otherwise project on both sides, as are to be found in the embodiment shown in FIG. 9a of the box profile portion 51d.

Figure 3A:
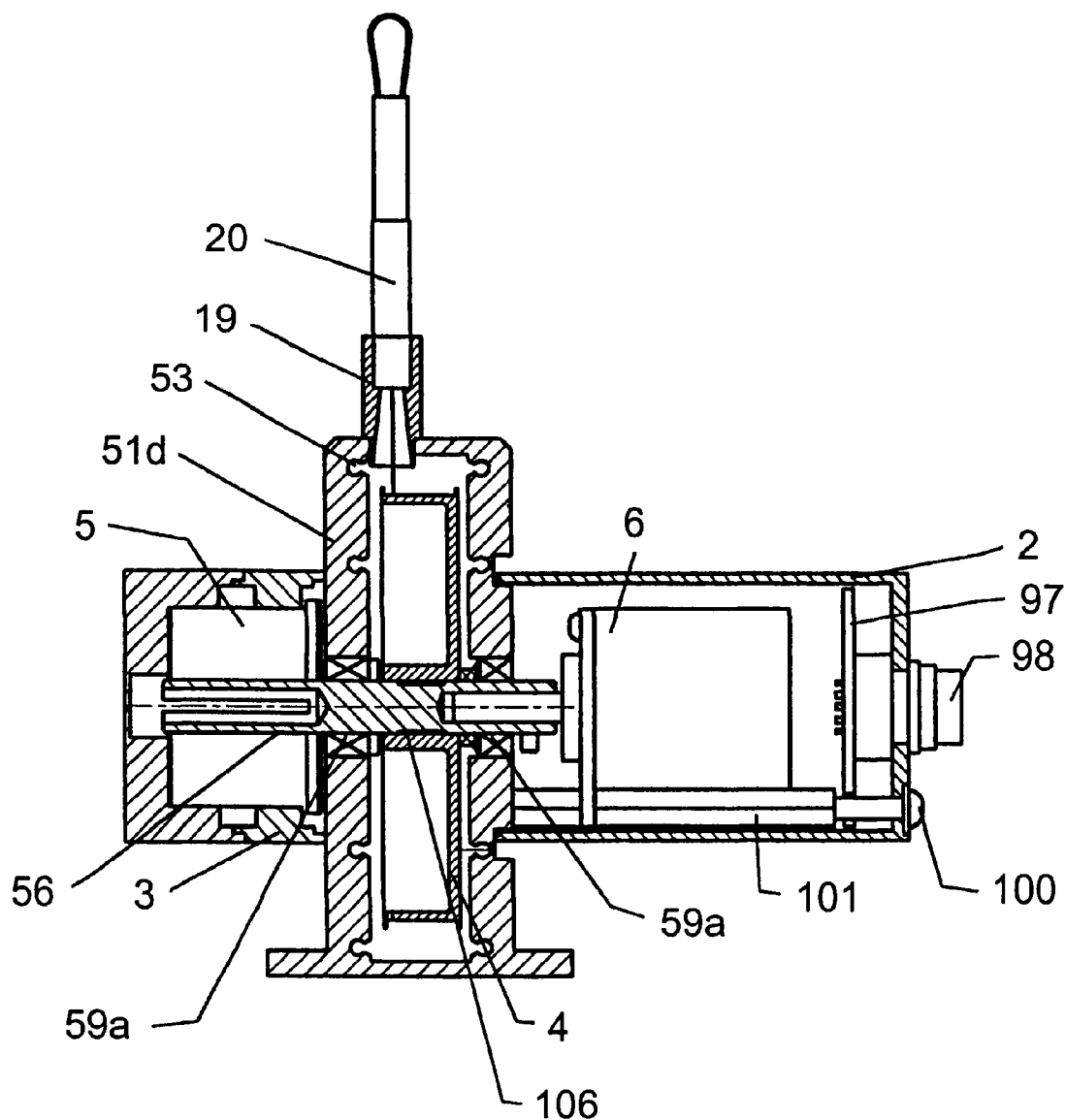

Looking now at FIG. 3a, the measuring cable travel sensor illustrated therein has a box profile portion 51d of such a configuration, with the projecting base plates 52 for mounting thereof.

In this arrangement however the spring 5 is again surrounded by a cup-shaped, one-piece spring shell portion 3 as a housing for same, as in the structure shown in FIGS. 1a and b.

The arrangement and the manner of mounting the rotary angle sensor 6 and the sensor shell portion 2 surrounding same correspond to the structure shown in FIGS. 2a and b, except for an annular groove which is provided in the outside surface, facing towards the right in FIG. 3a, of the box profile portion 51d. The free end of the sensor shell portion 2 which is of round cross-section is fitted into the annular groove and thus positioned in relation to the box profile portion 51d.

FIG. 3b shows a measuring cable travel sensor which is similar to the structure shown in FIG. 3a, but with a box profile portion 51'd whose particularity is that the wall thickness thereof in the middle region, that is to say in the region of the point of passage of the shaft 56 therethrough, is increased in order to afford more space there for bearing purposes and for affording shaft sealing integrity between the shaft 56 and the box profile portion.

Figure 3C:
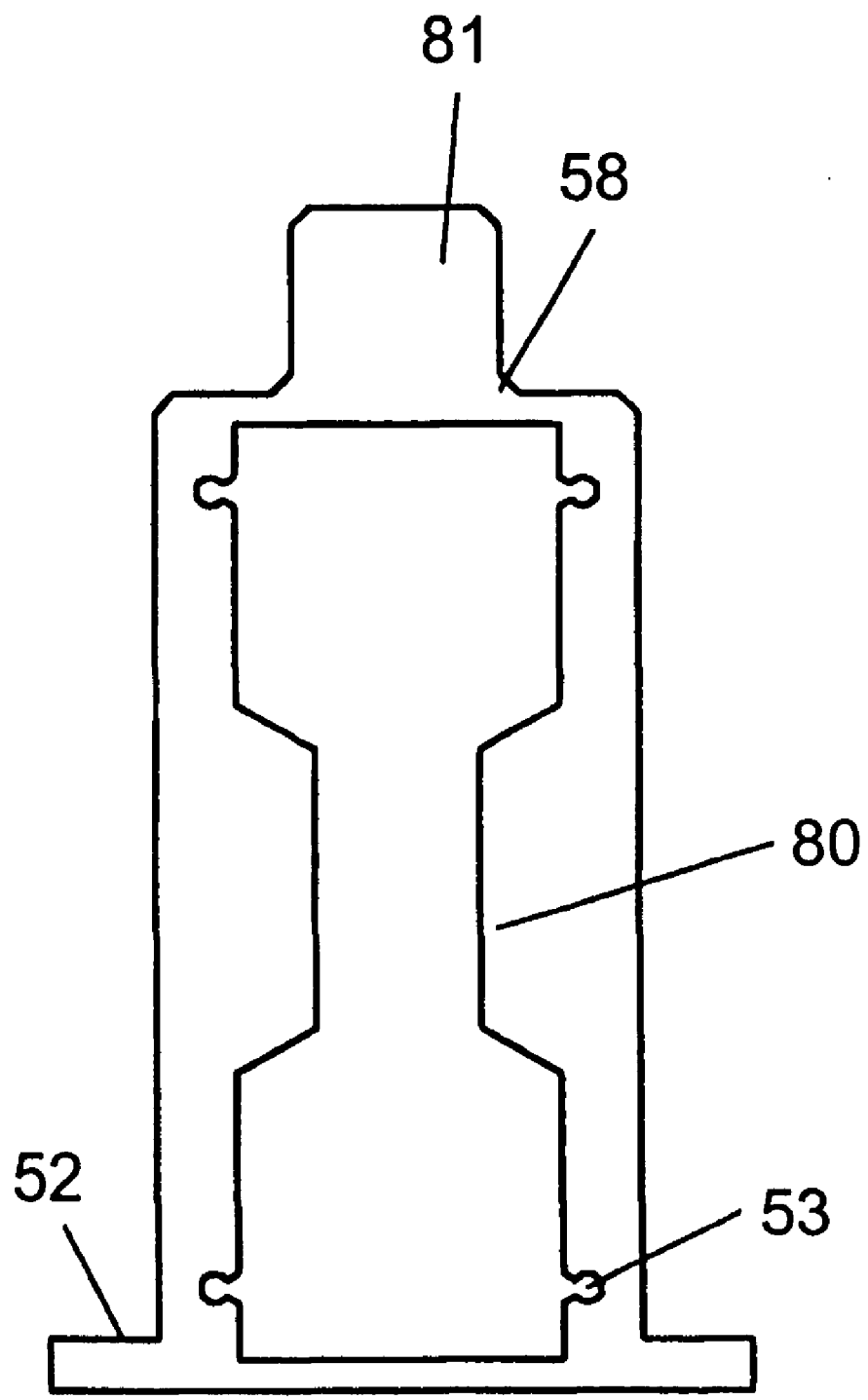

In order not to increase the outside dimensions of the box profile portion 51'd, for that purpose the box profile portion has an inwardly directed raised configuration on the inside surface of the lateral limbs, preferably with inclinedly rising flanks, as can best be seen in the illustration of the profile portion on its own in FIG. 3c.

The view in FIG. 3c also clearly shows the solid projection 81 on the extruded box profile portion, the projection 81 projecting on the top side of the profile portion, that is to say one of the narrow sides thereof, preferably the narrow side which is in opposite relationship to the mounting base plates 52. The projection 81 is later formed for example by a suitable machining operation to constitute a cable entry portion through which the measuring cable passes into the interior of the housing of the measuring cable travel sensor. That can be implemented by producing in the projection 81 a through bore extending in the direction in which the measuring cable will pass into the housing. A cable guide element can subsequently also be fitted into the bore in the projection 81. There is therefore no longer any need for separate production of the cable entry portion and connection thereof to the housing.

Reference will now be made to FIGS. 4a–c showing a side view, plan view and front view respectively of a further embodiment of a measuring cable travel sensor according to the invention. In this case also the core portion of the housing 1 comprises a box profile portion 51d accommodating the cable drum 4.

Unlike the structure shown in FIGS. 3a, b, in FIGS. 4a–c however the longitudinal direction as indicated at 50 of the box profile portion 51d does not extend horizontally but vertically so that the upper and lower horizontal end faces of the profile portion 51d have to be closed by suitable covers indicated at 62.

It will be noted in that respect from FIG. 4a in particular that the lower longitudinal cover 62 is thicker while as can be seen from FIG. 4b it is of such a size that it projects laterally beyond the base surface of the box profile portion 51d so that at that projecting portion it can be used to mount the measuring cable travel sensor to another component for example by screw means.

A further difference in this embodiment can be seen from FIG. 4a to which attention will now be more specifically directed.

As shown therein, the shaft 56 is formed in one piece together with the measuring cable drum, for example in the form of an injection molded plastic material component, so that the trunnion portion 7 of the rotary angle sensor 6 can be inserted from the end to such a degree that it even passes through the axial region of the cable drum 4, whereby the cable drum 4 is very close to the rotary angle sensor 6, more specifically directly at the centering collar 8 thereof, so that flexing of the trunnion portion 7 or the shaft and thereby angular displacement between those two components is very substantially precluded.

FIG. 4c is a view from the direction of the spring shell portion 3 showing the screw means 77 for screwing same to the box profile portion 51d, with the screw means being arranged in the corners of the quadrangular spring shell portion 3.

It will be seen therefore that the cable entry portion 19 with the cable guide element 20 disposed therein are arranged at the upper cover 62 and not in one of the secondary limbs 58 of the profile portion, as in the structures shown in FIGS. 1 through 3.

The advantage of this configuration lies in the possibility of pre-fabrication of the covers 62 including the necessary bore for the cable entry without those operations having to be carried out on a part of the profile portion for constituting the housing. That also affords the possibility of arranging the cable entry at locations which are disposed at different outward radial distances on the cover 62, depending on the size of the cable drum 4 used and the required length of cable.

Figure 5A:
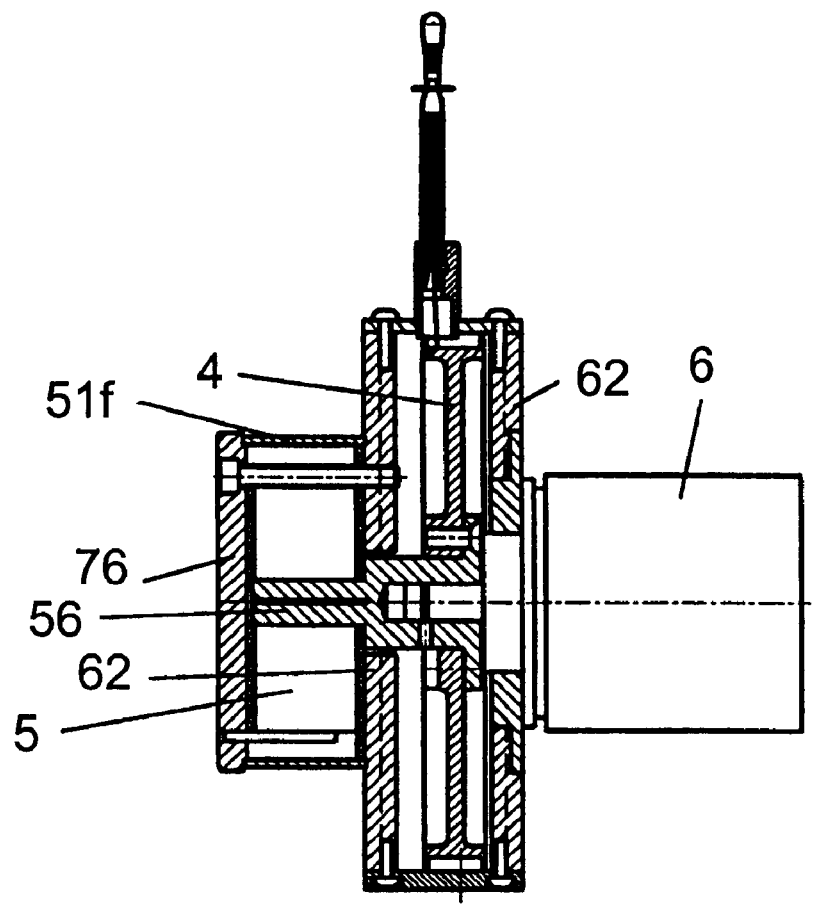
FIGS. 5a and 5b show an embodiment of the measuring cable travel sensor which is modified in relation to the foregoing structure.
Figure 5B:
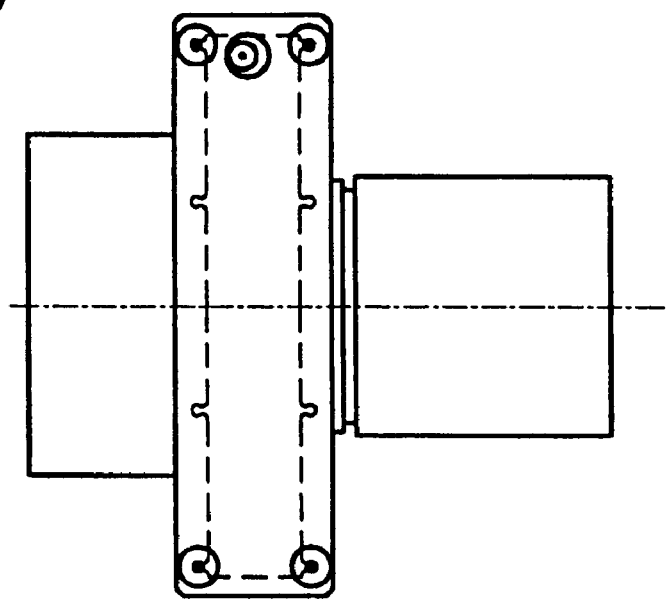

FIGS. 5a and b also show a sectional side view and a plan view of a measuring cable travel sensor comprising a housing formed by a box profile portion 51d of uniform cross-section, which is closed at top and bottom by a respective cover 62 which for the sake of clarity of the drawing is not shown in the view in FIG. 5b. Unlike the structure shown in FIG. 4 the spring 5 is surrounded by a housing which once again, as in FIGS. 2a and b, comprises a part of a round tubular profile portion 51f which is closed by a spring cover 76 at its free end.

Figure 6C:
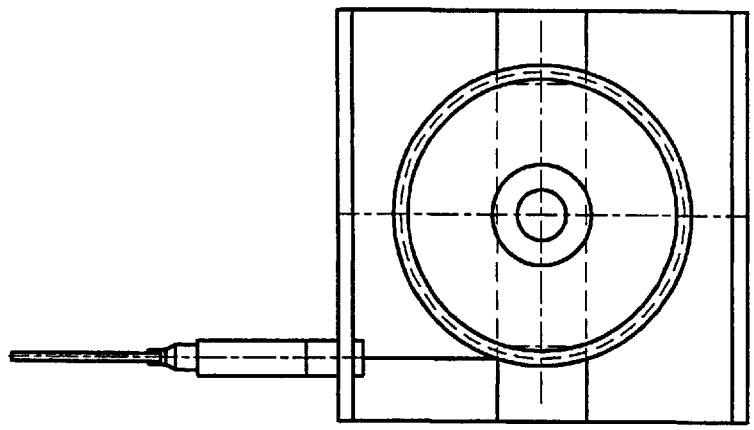
FIGS. 6a–c show a measuring cable travel sensor comprising a C-shaped profile portion.
Figure 6A:
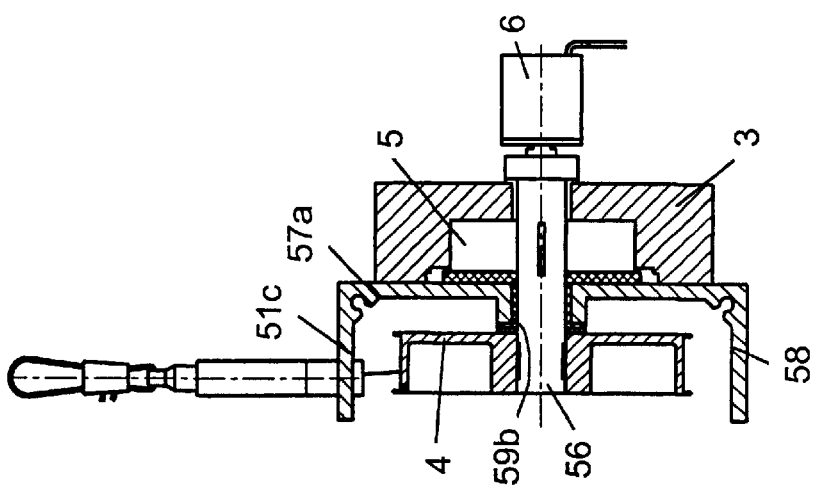
Figure 6B:
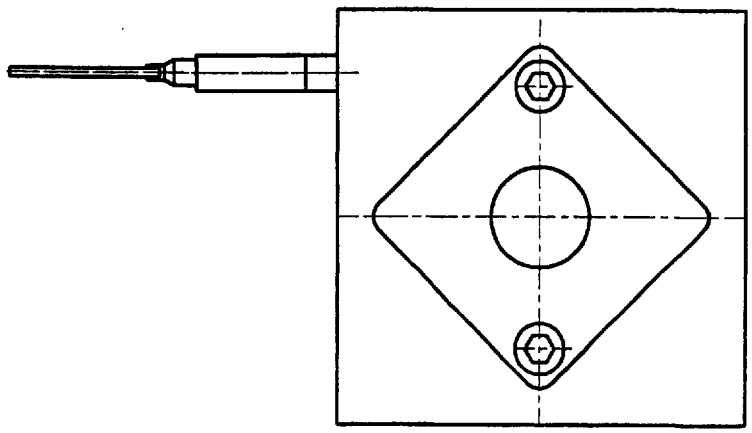

FIGS. 6a–c are a side view and two end views of a further embodiment of a measuring cable travel sensor in which however the cable drum 4 is arranged open in the free space defined by the configuration of a C-shaped profile portion 51c. It will be appreciated that structures of this kind can only be used in a clean environment.

Figure 10A:
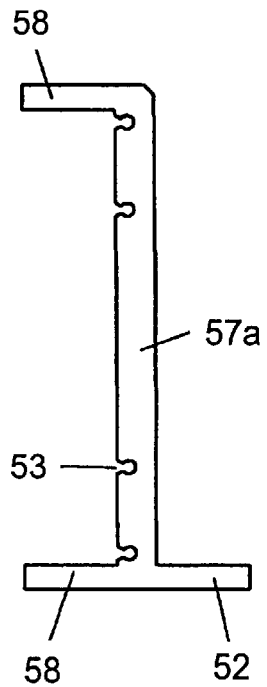
Figure 10B:
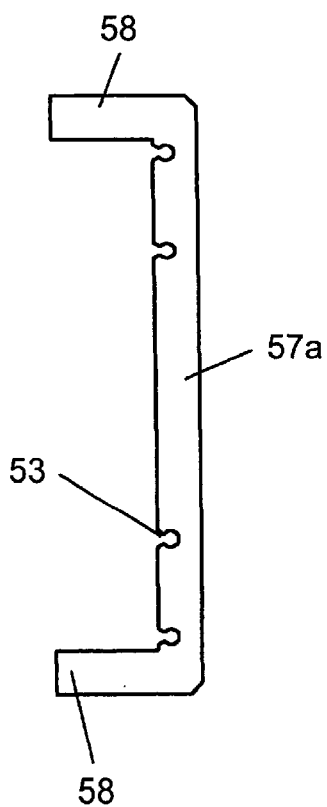

A corresponding similar C-shaped profile portion is shown as a separate component in FIG. 10b, wherein a main limb 57a and two secondary limbs 58 which terminate with free ends in a cantilever-like configuration are of approximately the same thickness of material. Longitudinal grooves 53 are arranged only in the main limb 57a, facing towards the internal space defined by the C-shape of the profile portion. In the case of the C-shaped profile portion shown in FIG. 10a the one secondary limb 58 is prolonged beyond the main limb 57a to constitute a mounting base plate 52.

Referring now back to FIGS. 6a–c again, in contrast thereto the C-shaped profile portion 51 shown therein is of relatively small wall thickness throughout, that is to say both at the main limb 57a and also at the secondary limbs 58. For that purpose, the center of the main limb 57a has an increase in the wall thickness thereof, more specifically in the region in which the limb is bored for the shaft 56 and for support thereof by means of a plain bearing 59b. Only one respective longitudinal groove is provided in each corner of the C-shaped profile, being formed directly in the inner region which is increased in thickness and bevelled for that purpose.

The cable drum 4 is releasably connected to the shaft 56, for example by way of splines, and the shaft 56 extends beyond the main limb 57a of the C-shaped profile portion 51c.

As shown in FIG. 6a, arranged on the outside of the main limb 57a is the rotary torsion spring 5 which is protected by a spring shell portion 3 forming a casing for same. In turn outside the spring shell portion 3, the rotary angle sensor 6 is fitted with its shaft trunnion portion 7 into the free end of the cable drum shaft 56. Accordingly, in contrast to all the embodiments of the invention described with reference to the drawings hereinbefore, the spring 5 is now disposed between the cable drum 4 and the rotary angle sensor 6.

This consideration also applies in regard to the constructions shown in FIGS. 7a–c which are only intended to illustrate the advantage that the use of a separate housing part for the cable drum 4 in the form of a C-shaped profile portion 51c means that it is possible to use C-shaped profile portions 51c of different dimensions, depending on the respectively desired size of the cable drum, without the need to make modifications to the other components such as for example the spring, the casing for the spring, the rotary angle sensor and the mounting means thereof, and so forth. Nonetheless, without this being necessary, the structures shown in FIGS. 7a and b provide that the spring shell portion is made up from a tubular portion and an end closure plate, whereas in FIG. 7c the spring shell portion is in the form of a cup-shaped integral component.

In all three structures as shown in FIGS. 7a–c the rotary angle sensor 6 which is non-rotatably clamped in the shaft 56 by means of a clamping screw (shown but not referenced) projects beyond a radially outwardly extending lever as a torque-resisting support 140 which is fixed at its free end to the spring casing by way of a bolt 141.

Figure 11A:
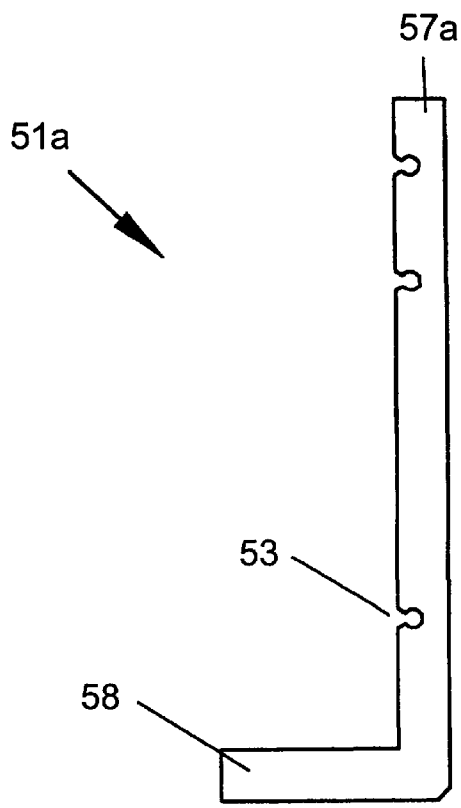
Figure 11B:
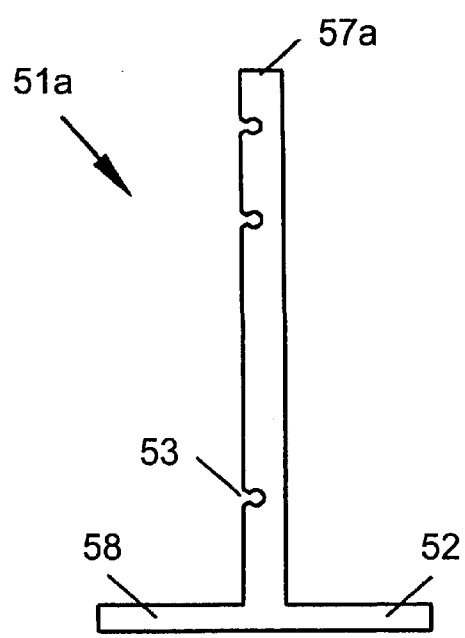

Looking now at FIGS. 11a, b also shown therein is an L-shaped profile portion 51a, more specifically being shown in FIG. 11b with a secondary limb 58 which is extended on the rear side of the main limb 57a, that is to say towards the right in FIG. 11b, to constitute a mounting base plate 52.

L-shaped limbs of that kind, just like a C-shaped profile portion 51c as shown in FIGS. 6 and 7. can also be used for fixing the cable drum 4 and/or the spring 5 on the oppositely disposed sides of the main limb 57a of the L-shaped profile portion.

It is likewise possible for the spring 5, irrespective of the form of the housing for the cable drum 4, equally to be protected by a part of a C-shaped profile portion or an individual box profile portion, in which case the length thereof preferably corresponds to the length of the part of the profile portion for the cable drum 4 in order to close both parts of the housing and join them together by way of joint longitudinally extending covers.

Figure 12:
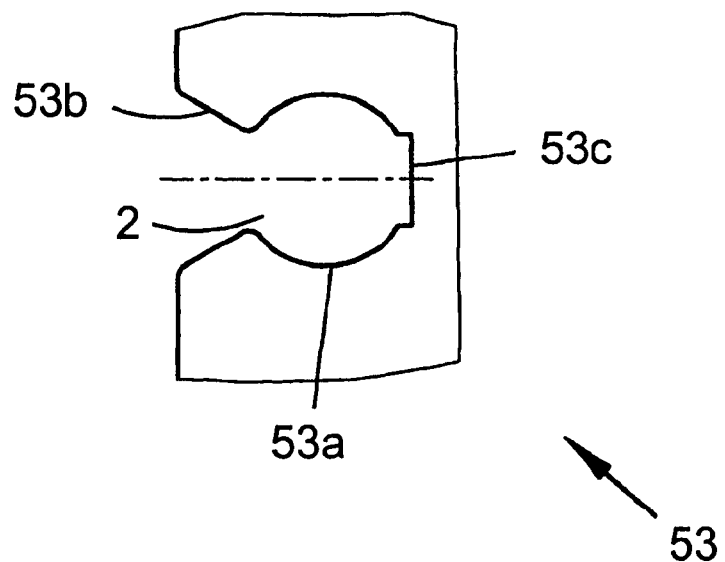
FIG. 12 shows a groove configuration.

Reference will now be made to FIG. 12 showing a detail view in cross-section of one of the longitudinal grooves 53 referred to hereinbefore.

The groove has a region 53a of circular cross-section, and the entry into the circular region 53a is in the form of a truncated cone 53b which decreases in width as it extends towards the region 53a. The bottom 53c of the groove is flat, constituting a shallow rectangular groove in the bottom of the circular region 53a. That facilitates the insertion of for example electronic circuit boards into a pair of mutually oppositely disposed longitudinal grooves 53.

Figure 13:
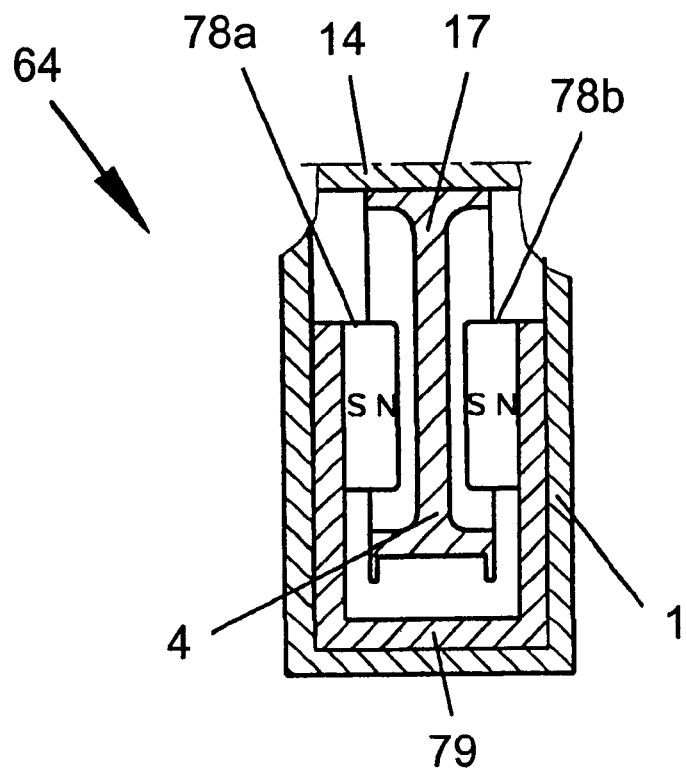
FIG. 13 is a sectional view through an eddy current brake for use in a sensor according to the invention, FIGS. 14a and b show examples of the shaft bearing and sealing arrangement in the housing of a sensor according to the invention, FIGS. 15a and b show detail views of a coupling between the rotary angle sensor and a shaft of the cable drum, FIGS. 16a and b show embodiments by way of example of a free cable entry portion for the housing of the invention, FIGS. 17a and b show detail views of a plug which comes out of part of the housing constituting a sensor shell portion, with associated evaluation electronics.

FIG. 13 is a detail view showing a brake 64 for the cable drum 4, in a structural form as an eddy current brake. In this arrangement, first and second permanent magnets 78a, 78b which are of opposite orientation in terms of their polarity are arranged on respective sides of the cable drum 4 which is rotatable freely therebetween and which is to be braked by the brake 64 as required. The permanent magnets 78a, 78b are connected together by way of a U-shaped flux portion 79 which externally embraces the cable drum 4 and which comprises a material permitting good magnetic flux such as for example iron. The magnetic flux produced between the two magnets 78a, 78b impedes rotary movement of the cable drum 4, in which respect the degree of impediment of the rotary drum movement can be varied by varying the free space between the magnets and the cable drum 4.

For operation of the eddy current brake 64 it is necessary for the housing 1 which surrounds the permanent magnets 78a, 78b and the drum 4 and to which the flux portion 79 is fixed to comprise a non-magnetic material, for example a plastic material or aluminum.

FIGS. 14a and b show the manner of mounting and sealing the rotary angle sensor shaft 56 in one of the walls of the housing 1 in greater detail, using a plain bearing as indicated at 82a and 82b respectively. In FIG. 14a the wall thickness of the housing 1 is reduced in the region of the plain bearing 82a and the plain bearing 82a which is in the form of a bush and which generally comprises plastic material is fitted into the wall of the housing, being held therein over the remaining thickness of the bore therethrough in the reduced-thickness portion of the wall of the housing 1.

The reduction in the thickness of the wall of the housing 1 is produced in the form of a recess in the inside surface of the wall of the housing 1, the recess being defined by a shoulder 83 which is of right-angled configuration in cross-section and which extends in an annular shape around the passage through which the shaft 56 extends. The recess defined by the shoulder 83 accommodates an annular seal 84 which is generally V-shaped, as viewed in the axial direction of the shaft 56, and which bears with its sealing lip against the bottom of the recess and/or the shoulder 83. In this arrangement the seal 84 rotates with the shaft 56 and bears slidingly against the surface of the recess defined by the shoulder 83.

FIG. 14b shows in contrast a construction which is preferably used in a housing 1 which is of greater wall thickness. The plain bearing 82b which is in the form of a bush preferably extends over the entire thickness of the wall of the housing 1 or even laterally beyond same. In the respective end regions of the plain bearing 82b. respective annular seals 84 are so fitted into and fixed in suitable annular grooves in the plain bearing 82b that the sealing lips thereof face radially inwardly towards the shaft 56 and bear slidingly against the outside peripheral surface thereof and also preferably face inclinedly outwardly, as viewed from the wall of the housing 1.

It will be seen therefore that this configuration involves a free annular space defined between the inside periphery of the plain bearing 82b, the outside periphery of the shaft 56 and the sealing lips of the seal 84, and a filling comprising a lubricant 85 can be contained in that annular space, thereby drastically to reduce the wear to which the bearing arrangement is subjected.

Figure 15B:
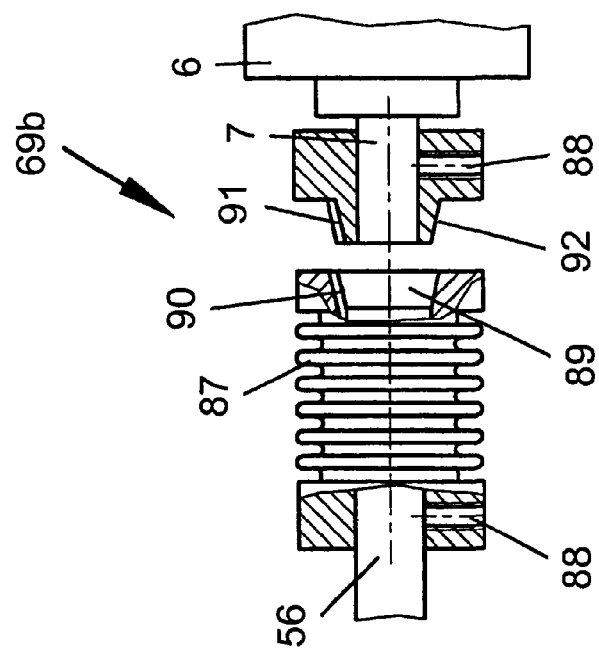
Figure 15A:
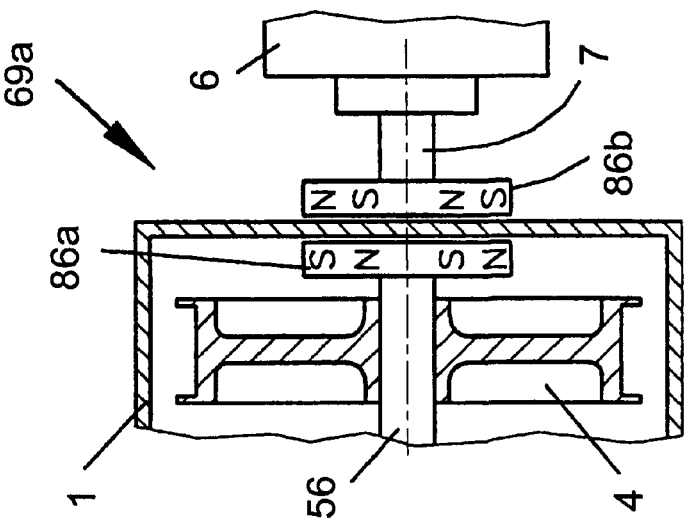

Attention is now directed to FIGS. 15a and 15b showing two alternative configurations of a coupling 69 with which the shaft 56 of the cable drum 4 is non-rotatably connected to the trunnion portion 7 of the shaft of the rotary angle sensor 6.

FIG. 15a shows a magnetic coupling 69a in which the shaft 56 carrying the cable drum 4 carries at its end in front of the wall of the housing 1 a circular magnet 86a which is provided alternately in a portion-wise manner with North and South poles in the peripheral direction and which rotates with the shaft at the smallest possible spacing relative to the inward surface of the housing 1 which comprises non-magnetic material.

In a similar manner, such a circular magnet 86b is also arranged on the outside of the housing 1 on the trunnion portion 7 which is thus coaxial and as aligned as possible with the shaft 56, so that rotation of the inwardly disposed circular magnet 86a, by way of the magnetic flux involved, also rotates the outwardly disposed magnet 86b which is non-rotatably connected to the trunnion portion 7 and thus the rotary angle sensor 6.

FIG. 25b shows a further alternative configuration of a mechanical coupling 69b. It comprises on the one hand a bellows 87, the function of which is to allow and compensate for angular displacement between the parts to be connected together, namely the shaft 56 on the one hand and the trunnion portion 7 of the rotary angle sensor 6 on the other hand. One end of the bellows 87 is clamped on the end of the shaft 56 in any suitable fashion, for example by way of a transversely extending screwthreaded bore 88 and a clamping screw (not shown) which is to be screwed therein. At the opposite end the bellows 87 has a conical recess 89 which at at least one location on its conical periphery, has a groove 90 which is arranged in the inwardly facing peripheral surface of the recess 89 and which therefore also extends in a tapering configuration relative to the longitudinal direction of the shaft 56.

Reference numeral 92 in FIG. 15b denotes a counterpart taper member which is of a configuration corresponding to the tapering recess 89 and which therefore suitably fits therein. The counterpart taper member 92 is non-rotatably clamped on the trunnion portion 7 of the shaft of the rotary angle sensor 6, once again as illustrated by means of a transverse bore 88 and a clamping screw (not shown) screwed therein. The counterpart taper member 92 has at least one projection 91 extending in the longitudinal direction on its peripheral surface and fitting into the groove 90 in the recess 89.

By virtue of a taper angle of markedly less than 45° and in particular less than 30° with respect to the longitudinal direction of the shaft 56 or the trunnion portion 7, such a shaft coupling performs the additional function of compensating for a variation in the axial spacing between the shaft 56 and the trunnion portion 7 while also additionally allowing for easy assembly.

Referring now to FIGS. 16a and b, shown therein are two particularly advantageous embodiments, indicated generally at 19' and 19", of a cable entry connection portion which was indicated for example at 19 in FIG. 3a.

A common aspect of the two cable entry portions 19' and 19" is that the through opening which extends in the longitudinal direction of the cable not only has a trumpet-shaped enlargement 93 on the inward side, as is to be found in prior cable entry portions of such a kind and which is necessary for lateral displacement of the measuring cable on being wound on to and unwound from the cable drum, but in addition the through opening also has on the outward side a generally similar trumpet-like enlargement indicated at 93'.

In that respect the through opening has a smooth internal contour without edges and sharp or severe transitions. In that way it is possible for the part of the measuring cable which is outside the housing not to have to extend precisely on the center line of the through opening, but rather it may involve a lateral deviation therefrom of ±15°. That then generally admittedly results in the measuring cable rubbing against the inside contour of the cable entry portion 19' and 19" respectively, but if the cable entry portion comprises PEEK (polyether ethylene ketone) as an injection molding or is produced by cutting machining from the solid, that nonetheless gives the cable entry portion a sufficiently long service life by virtue of the high level of resistance to temperature and resistance to abrasion wear of that material.

The cable entry portion 19" shown in FIG. 16b has an annular shoulder 94 and an annular groove 95 of semicircular cross-section, and these serve for assembly and in particular insertion of the cable entry portion 19" transversely to the cable entry direction into a suitable opening in the housing. A similar consideration applies in regard to the annular groove 96 of rectangular cross-section in the structure shown in FIG. 16a.

Figure 17B:
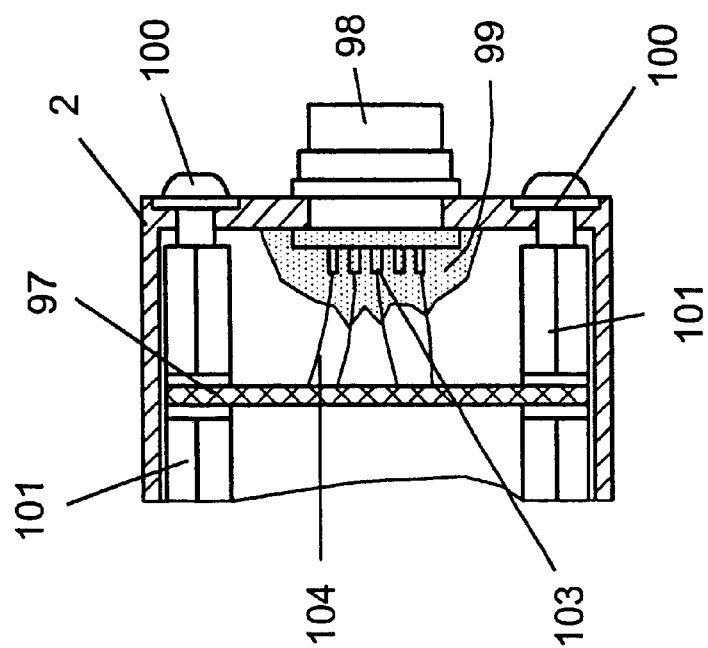
Figure 17A:
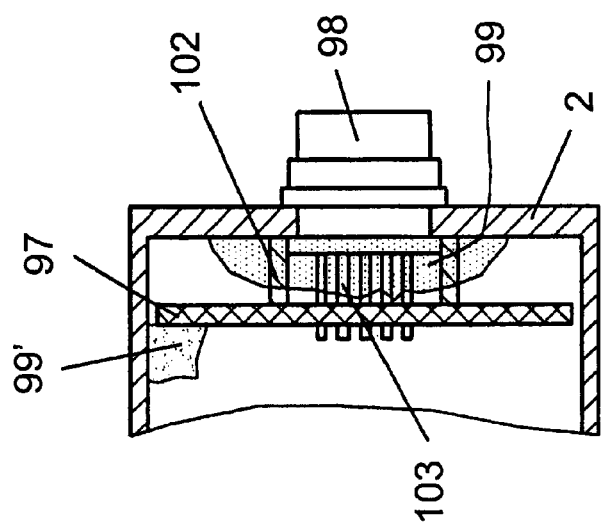

Reference will now be made to FIGS. 17a and b showing a detail view of the arrangement of an electronic circuit board 97 carrying evaluation electronics within the sensor shell portion 2 of the housing 1, as can be seen for example in FIG. 2a, and the plug 98 which is connected thereto and which extends out of the sensor shell portion 2. In both cases the board 97 is arranged parallel to the free end face which is at the right in the drawing, in the interior of the sensor shell portion 2, and at a spacing in relation thereto, while the plug 98 passes through that end part of the housing.

In the arrangement shown in FIG. 17a the board 97 is mechanically firmly connected for example by soldering or brazing by way of contact pins 103 which project from the inside of the plug 98, while on the other hand it is supported with respect to the inside of the end part of the sensor shell portion 2 by way of a spacer sleeve 102 which extends in an annular configuration concentrically around the plug 98. At its outer periphery the board 97 is disposed at a spacing relative to the inner peripheral surface of the sensor shell portion 2.

In the arrangement shown in FIG. 17b in contrast the board 97 and the plug 98 are only electrically connected together by way of wires but are mechanically separately mounted.

In this case, the board 97 is held in a condition of positively locking relationship by at least two fixing bolts or pins in the plane of the board 97 and transversely with respect to the plane thereof. The fixing bolts or pins extend transversely to the plane of the board 97 along the insides of the peripheral surface of the sensor shell portion 2 and serve to provide for screwing as indicated at 100 between the sensor shell portion 2 and the rest of the housing which can be seen for example in FIG. 2a, for example the profile portion 51d, while at the same time performing the function of a torque-resisting support for the rotary angle sensor 6.

The plug 98 is screwed in per se known manner with respect to the end part of the sensor shell portion 2, through which it passes. The contact pins which project from the inward end of the plug 98 are connected by way of wires 104 to the side, which faces towards same, of the board 97.

In both of the arrangements shown in FIGS. 17a and 17b, at least the region at which the contact pins 103 come out of the rear of the plug 98 and the transition between the plug and the inward side of the sensor shell portion 2, against which the plug 98 bears. are sealed by means of a sealant, in particular which sets hard, for example a suitable plastic resin. Preferably the sealing material in the arrangement shown in FIG. 17a embraces the whole of the intermediate space between the board 97 and the wall of the sensor shell portion 2 through which the plug 98 passes, or also completely encloses the board 97, as is indicated in the form of alternative sealing configurations referenced 99 and 99' respectively.

In the structure shown in FIG. 17b, at least the connection between the contact pins 103 and the wires 104 is sealed, in which respect care is taken to ensure that the screw means 100 and the positively locking connection between the board 97 and the fixing pins or bolts 101 is not also sealed in.

FIGS. 18a–c show various different connections between the shaft 56 and the cable drum 4, as can also be seen for example in FIG. 2.

In the structures shown in FIGS. 18a and 18b the cable drum 4 and the shaft 56 are separate components.

More specifically therefore in FIG. 18a the cable drum 4 whose central opening therethrough is a precise fit on the outside diameter of the shaft 56 is pushed on to same and fixed at the desired location thereon by a clamping screw 105 which is screwed transversely to the shaft 56 through the hub of the cable drum 4. For that purpose the cable drum 4 has an end disk portion only at one of its ends, so that the other face of the cable drum 4 is open, and the hub is extended at the latter end beyond the rest of the end face of the drum 4 so that the clamping screw 105 can be arranged to be readily accessible in that extended region.

In the arrangement shown in FIG. 18b the cable drum 4 is fixed on the shaft 56 by means of a tolerance ring 106 which is arranged in a suitable annular groove in the shaft 56 and on to which the cable drum 4 is simply pushed, in the longitudinal direction of the shaft 56.

In this case, the tolerance ring 106 comprises an annularly slitted, that is to say C-shaped ring which in the direction of view in the axial direction of the shaft 56 is in the form of a corrugated band so that the raised corrugation portions thereof project beyond the outside periphery of the shaft 56. By virtue of the drum 4 being pushed thereover, those corrugation portions are pressed flat somewhat and thereby clamp the cable drum 4 in position on the shaft in force-locking engagement therewith, without the need for further measures, whereby the tolerance ring 106 increases in length in its peripheral direction while the width of the slit thereof is reduced.

That arrangement makes it possible to tolerate a larger dimensional clearance between the inside periphery of the opening in the drum 4 and the outside peripheral surface of the shaft 56.

FIG. 18c shows on the other hand a structure in which the shaft 56 is formed in one piece together with the cable drum 4. In this respect the cable drum 4 with an end disk at only one side and an extended hub region projecting on the other side, with a through bore for the clamping screw 105, corresponds to the structure described hereinbefore with reference to FIG. 18a. However, the end of the hub region on the side of the clamping screw 105 has only a central blind hole for insertion of the trunnion portion 7 of the rotary angle sensor 6, as can once again best be seen from FIG. 2a. On the opposite side, the shaft 56 which is formed in one piece with the cable drum 4 extends axially towards the left in FIG. 18c from the face of the cable drum 4. The shaft 56 is provided from its free end on the one hand with a blind bore 107 and on the other hand with a spring slot 71 which is of approximately the same depth. It will be seen however that neither the blind bore 107 nor the spring slot 71 reach the region of the cable drum 4. Alternatively, instead of the blind bore 107 and the opposite blind bore 107' for accommodating the trunnion portion 7, the arrangement could also have a through opening.

As already indicated above, the spring slot 71 serves for insertion of the cranked inner end of the flat spiral spring while the blind bore 107 serves for the insertion therein of a mounting trunnion portion which is connected to the housing, and thus serves to support the shaft 56 at its free end remote from the trunnion portion 7 at the end part of the shaft of the rotary angle sensor 6.

FIGS. 19 through 23 show different design configurations of the cable drum 4, in plan and as a view in longitudinal section respectively.

A common aspect of all the structures shown in FIGS. 19 through 23 is that each cable drum 4 has at the center an opening and in particular a through opening as indicated at 108, disposed on the axis of rotation of the drum, while provided on the outside peripheral surface which acts as the winding surface 66 for the measuring cable to be wound thereon and unwound therefrom, at the ends thereof, are edges 109 forming check or end guide surfaces in order to prevent the measuring cable which is to be wound on from sliding off. It will be appreciated that the measuring cable is not shown in FIGS. 19 through 23 for the sake of clarity of the drawing.

Figure 19A:
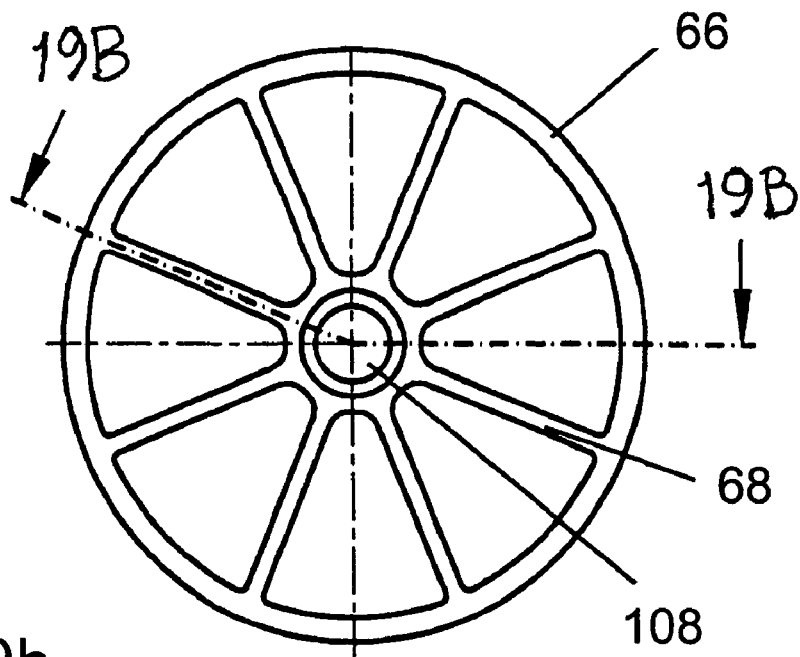
FIGS. 19a through 23b show various forms of the measuring cable drum.
Figure 19B:
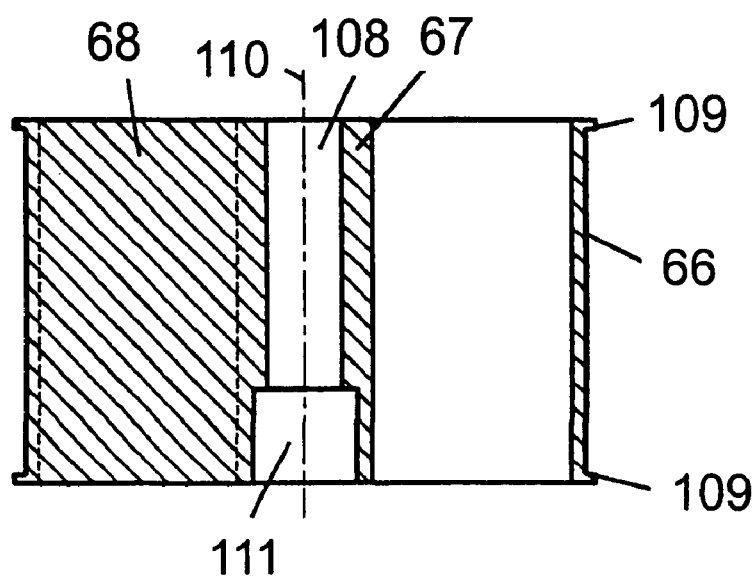

Referring to FIG. 19a and b, shown therein is a drum 4 as could be produced by being cut to length from an endless extrusion, after extrusion in the direction of the axis of rotation 110 of the drum 4. In this case the winding surface 66, the hub 67 and the spokes 68 are formed integrally with each other. The only finishing machining operation involves producing on the external peripheral surface a recess or depression which extends almost over the entire axial extent of the winding surface 66 and which results in the formation of the radially projecting, peripherally extending edges 109 at the respective circumferential ends of the winding surface 66.

The opening 108 which passes through the drum 4 on the axis of rotation 110 thereof, for receiving the shaft 56, also has to be subsequently increased in width to form an enlargement portion as indicated at 111.

Figure 20A:
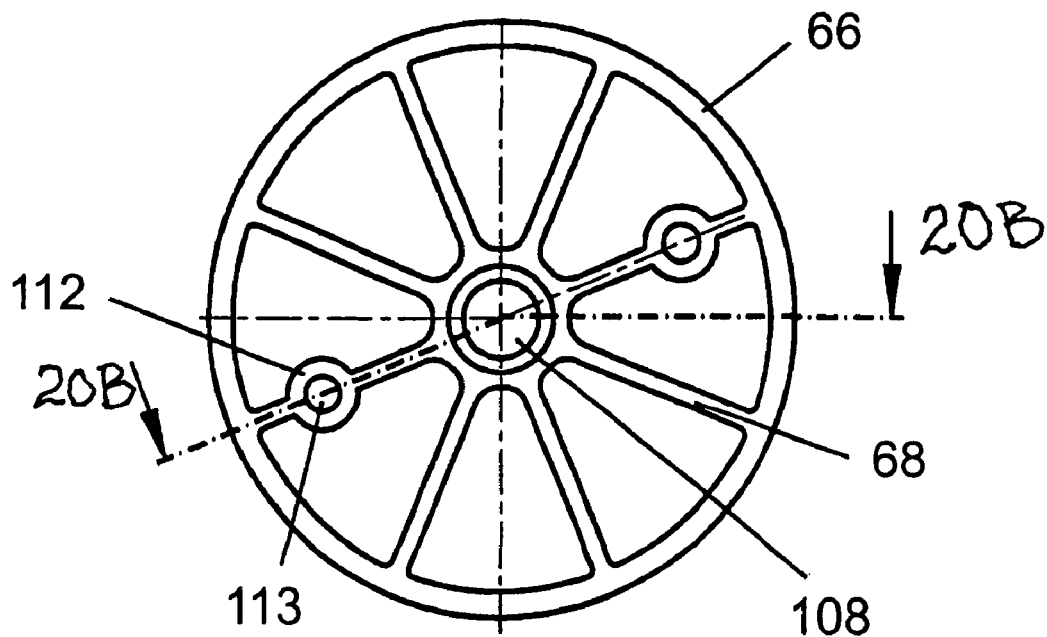
Figure 20B:
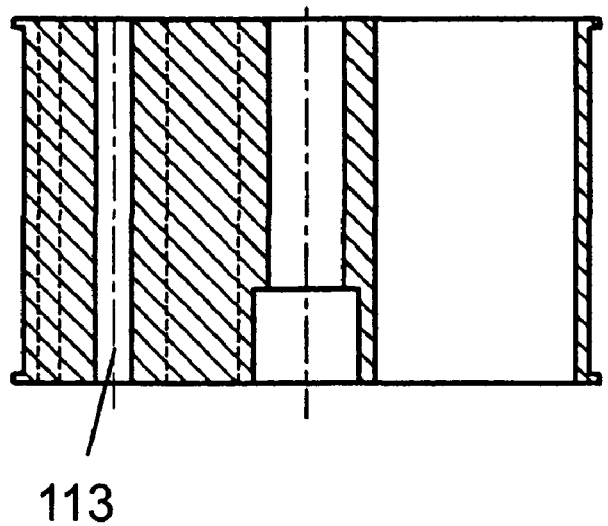

The structure shown in FIGS. 20a and b differs from that shown in FIGS. 19a and b in that a thickened portion 112 is additionally provided in some spokes 68, for example in first and second mutually opposite spokes 68, approximately at the center of the radial extent of such spokes. The thickened portion 112 serves to receive a longitudinal opening 113 which extends therethrough in a direction parallel to the axial direction of the drum and into which longitudinal guide elements can be fitted.

Figure 21B:
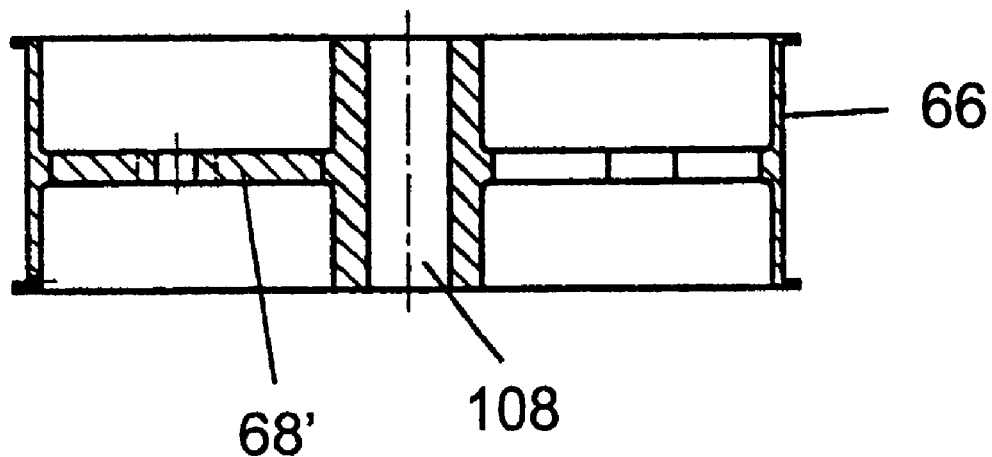
Figure 21A:
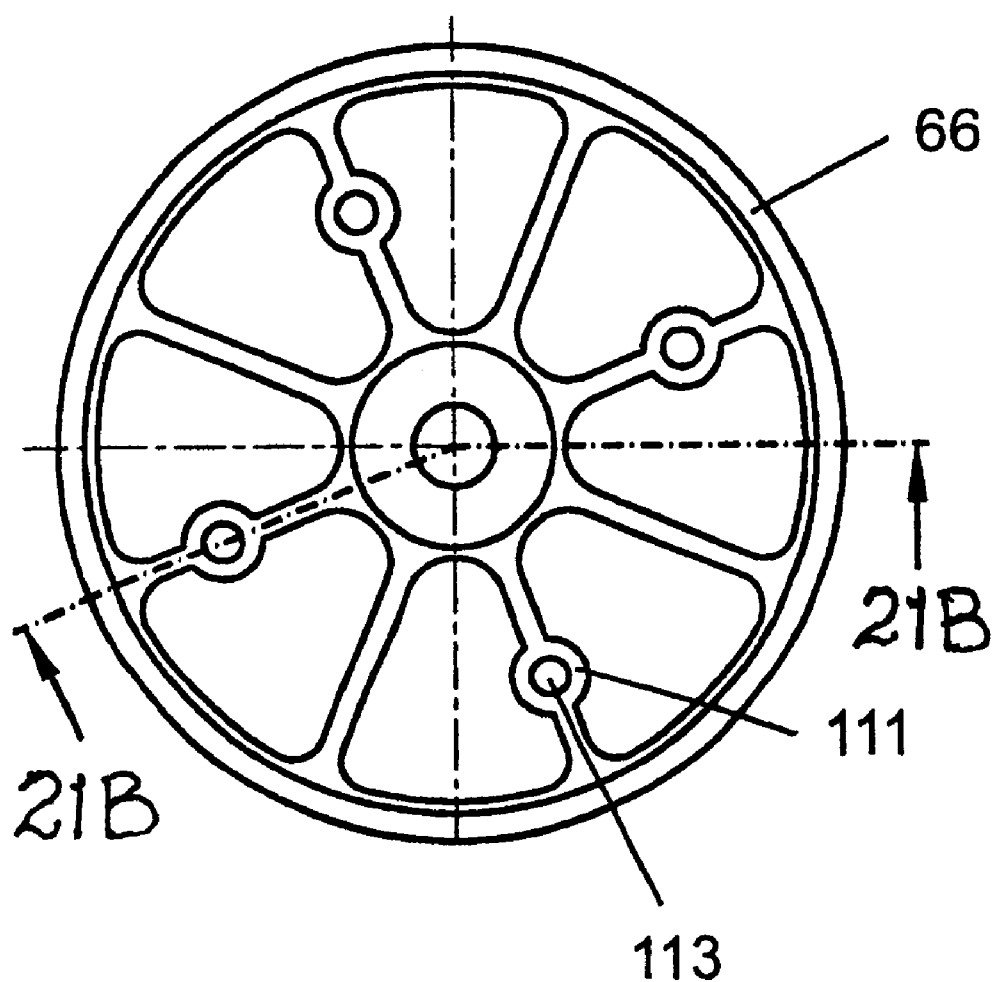

The structure shown in FIGS. 21a and b differs from that shown in FIGS. 20a and b in that in addition, for reasons of saving space, the spokes which upon being produced from an extrusion are continuous over the entire axial extent of the drum, are reduced in that axial direction to a fraction of the overall axial length of the drum by milling the spokes away in part or by applying some other suitable material-removal procedure. For reasons of strength and stability, material is removed in that case from both sides of the spokes so that axially short spokes as indicated at 68' in FIG. 21b remain which are positioned approximately at the center of the axial extent of the drum.

In this case also spokes 68' have thickened portions 111 in which longitudinal openings 113 are provided. In this case, thickened portions 111 are provided in two pairs each of two diametrally opposite spokes 68'.

Figure 22B:
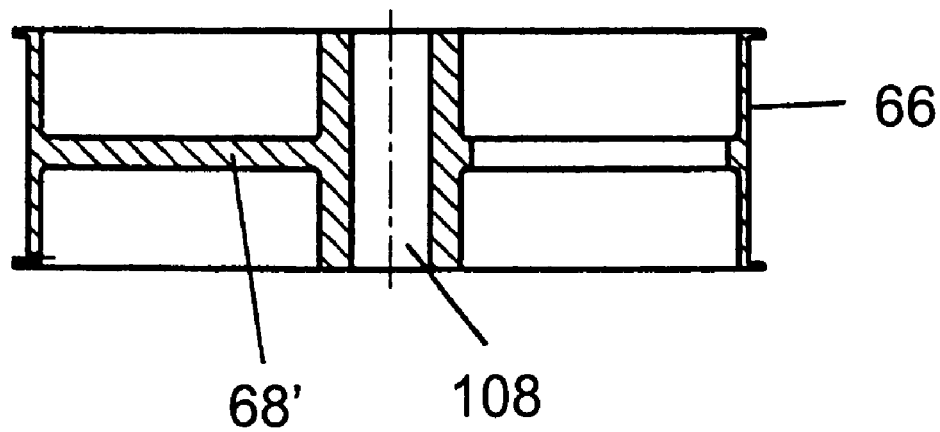
Figure 22A:
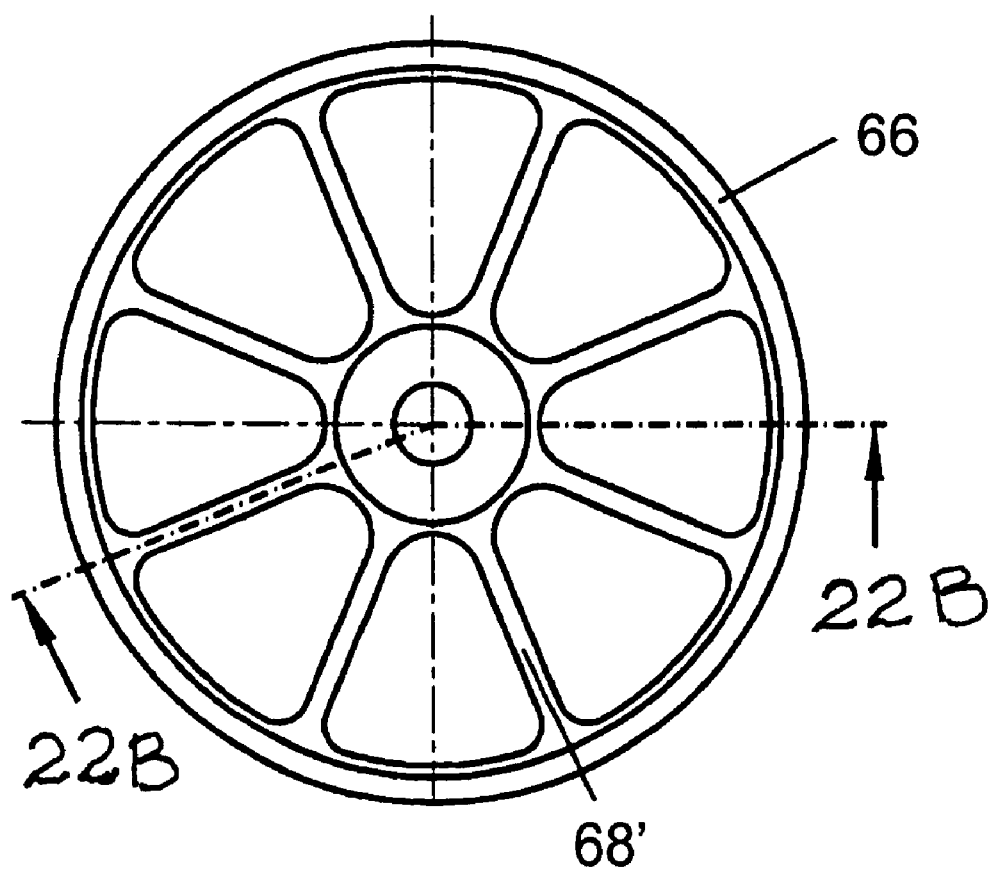

The structure shown in FIGS. 22a and b differs from that shown in FIGS. 20a and b in that the spokes 68' are of a uniformly slender configuration over their entire radial length and do not have any such thickened portion 111 with opening 113 therein.

Figure 23A:
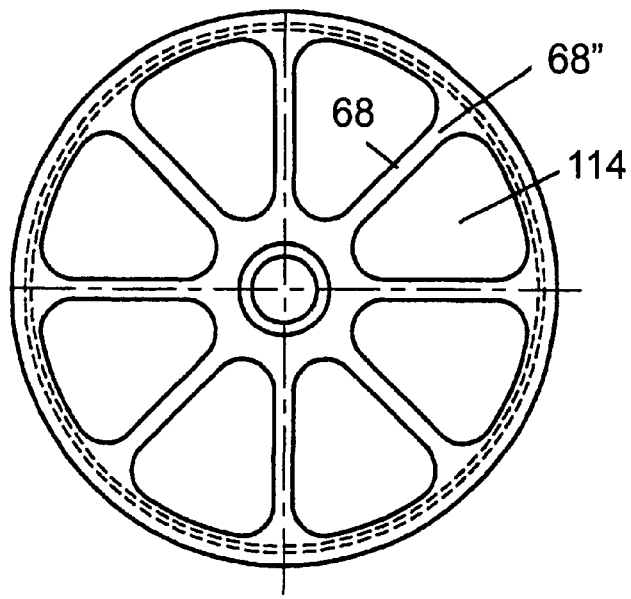
Figure 23B:
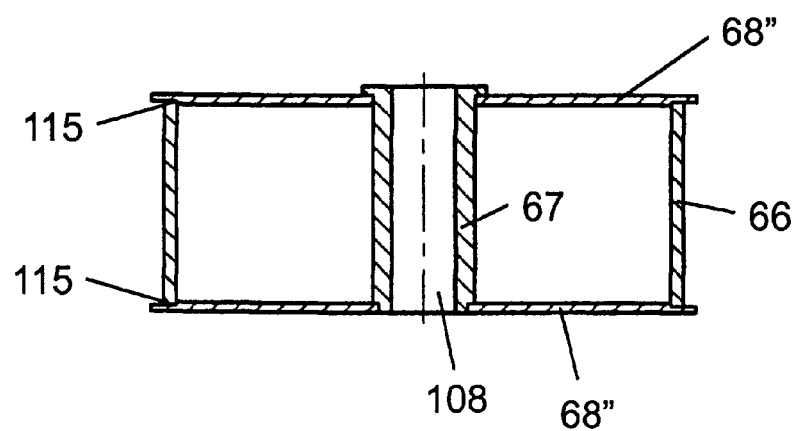

The arrangement illustrated in FIGS. 23a and b involves a cable drum of a multi-part structure.

The winding surface 66 comprises a tube portion, and similarly for the hub 67. Those two parts are joined together by end spoke plates or disks 68" which are of a round external contour and which have a central opening for receiving the hub 67.

Individual spokes 68 are formed in the plates or disks 68" by making openings therein, in the form of spaces indicated at 114 between the individual spokes 68. The spaces 114 can be produced by stamping, milling, sawing or any other suitable material-removal procedure.

The fixed and in particular non-rotational connection of the individual parts to each other is effected by adhesive means, soldering, welding or any other suitable form of connection such as for example using a press fit.

In order to ensure precise positioning of the individual parts relative to each other before they are connected together, the tubular sleeve 67 has at its outer periphery in the region of the respective ends thereof a respective shoulder which faces in the same direction, for bearing against the inside periphery of the respective spoke disk 68'. In addition in the proximity of their outer periphery the spoke disks 68 have an annular step 115 which in the assembled condition of the spoke disks 68" is directed towards the respective other spoke disk and serves for positioning the tubular winding surface 66 on the drum. In this case, the step 115 only has to be a few tenths of a millimeter in depth in the axial direction and can be produced using any known material-removal procedures, in particular however it can also be produced by chemical etching.

Referring now to FIG. 24, shown therein is a multiple measuring cable travel sensor having a profile portion 51 serving as a housing, which is cut to such a length that two complete measuring cable travel sensors with all associated components can be disposed in succession therein, that is to say with their shafts disposed parallel and at a spacing relative to each other, with for example measuring cable drums suitably mounted thereon.

Thus, FIG. 24 shows a multiple measuring cable travel sensor assembly of that kind having first and second sensor units, each of them being viewed in the direction of view for example in FIG. 3a from the right therein, that is to say on to the end of the sensor shell portion 2, and also including a mounting base plate 52 at the lower end of the profile portion 51, in regard to the illustrated orientation of the sensor as shown in FIG. 24.

It will be apparent however that it is also possible for substantially more than two sensors to be arranged in a single profile portion 51 constituting a housing in that way.

It will also be seen from FIG. 24 that in the present case the two sensors have cable drums 4' and 4" of different sizes, depending on the desired situation of use involved.

It will also be seen that the cable entry portion 19 with cable guide element 20 can be arranged at each of the outside surfaces which extend in the longitudinal direction of the profile portion 51 and which are perpendicular to the longitudinal surface on which the sensor shell portions 2 are mounted, and also the end faces of the profile portion 51, that is to say the cover 61 for closing each of those end faces.

In addition at each of those faces there is also the choice of arranging the cable entry portion on a line tangential to the respective drum 4' or 4", depending on the desired winding direction, that is to say in the clockwise direction or the counter-clockwise direction, for the measuring cable on the drum 4' or 4".

In that respect FIG. 24 shows various possible positions for unwinding the measuring cable in the counter-clockwise direction, by the use of solid lines, while for unwinding the cable in the clockwise direction the positions are indicated in broken lines.

FIG. 25 shows various different cable end connections, by means of which an adaptor portion 124 for fixing that component whose position is to be determined by operation of the measuring cable travel sensor is fixed in the end region 122 of the cable.

In this respect, the basic problem is that a damping component must also be provided at the cable end connection, to cover the situation where the end of the measuring cable which is far away from the measuring cable travel sensor is released or moves very rapidly towards the measuring cable travel sensor and then impacts with a high level of kinetic energy against the cable entry portion 19 which is shown for example in FIG. 1 and onwards.

So that the cable end connection is not damaged or even totally destroyed when such impact occurs, a damping mouthpiece or sleeve 121 is so arranged that when impact occurs it is interposed between the adaptor member 124 and the surface at which such impact occurs, generally the end face of the cable entry portion 19.

As shown in FIG. 25a the arrangement comprises a damping sleeve of rubber or another elastic material which is arranged on the cable end region and which has a through opening loosely embracing the end portion 122 of the cable. In order to prevent relative movement between the rubber sleeve and the adaptor member 124 which in FIG. 25a is a shackle-type nipple to which the carabiner hook 120 is connected, the damping sleeve 121 is fixedly connected to the adaptor portion 124, for example a shackle nipple 132, by being fixedly pushed thereon, by adhesive means or in some other fashion.

In FIG. 25b the adaptor member is a screwthreaded bolt 126 to which the cable end portion 122 is fixedly connected. The damping sleeve 121 is pushed or secured by adhesive means on the exit side of the cable end portion 122, on an external shoulder arranged at that location, while at the opposite end the screwthreaded bolt 125 has a female screwthread 126 for screwing in a further component.

The structures shown in FIGS. 25c through g, instead of the damping sleeve 121 which loosely embraces the end portion 122, has a shaped portion 127 of elastic and preferably even deformable material which however closely embraces the cable end portion 122, preferably also in the region of the junction between the cable end portion 122 and the respective adaptor member 124. The portion 127 is applied by being injection-molded around the cable, by being shrunk therein, by being pressed thereon or in some other suitable fashion which provides an intimate join between the outside periphery of the cable in the end portion 122 and the shaped portion 127.

The aim of all those structures is to achieve the best possible damping effect in a situation involving the above-described undesirable impact of the cable end against the measuring cable travel sensor.

The interplay between the damping sleeves 121 which extend over a substantial axial distance or the shaped portions 127 whose axial extent is at least 1 cm and preferably at least 3 cm, and the housing structure in the form of a profile portion which is very stiff but nonetheless has a good damping action thus affords a very good damping effect in relation to such impact as referred to above, in particular when the shaped portion 127 is intimately joined to the end portion 122 of the cable as forces can be carried and absorbed over the entire axial length of such a connection.

FIG. 25c uses the same shackle nipple 132 as in FIG. 25a, once again with a carabiner hook 120 as the fixing means, but the connection which cannot be seen between the end of the cable and the nipple 132 is already completely and tightly embraced by the portion 127.

The arrangement shown in FIG. 25d differs insofar as the adaptor member 124 used is a ring 128 around which the end portion 122 of the cable passes.

In contrast, in FIG. 25e the adaptor 124 is a ring eye 129 which is connected only at one side to the end portion 122 of the cable.

In FIG. 25f the adaptor member 124 is a screwthreaded bolt 130 similar to the screwthreaded bolt 126 in FIG. 25b, but with a male screwthread for fixing further components on the side remote from the cable end portion 122.

In FIG. 25g the adaptor member 124 used is a forked head 131 which at its free end has a fork for a transverse pin to be passed therethrough or screwed therein.

The material used for the shaped portion 127 is in that respect in particular preferably a highly adhesive highly elastic material such as for example a hot-melt adhesive which already becomes of a low-viscosity doughy constitution at between 150° C. and 300° C., while preferably the cable is an in particular twisted stranded cable comprising a plurality of filaments so that the material of the viscoelastic portion 127 can adhere in the interstices thereof.

Such a hot-melt adhesive could be for example a modified polyamide, a polyurethane, a polyethylene or a polyoxymethylene (POM), but also a silicone, an elastic epoxy resin or an elastic polyurethane, in which respect the three last-mentioned substances can also be injected in a cold condition.

The operation of injecting the material around the cable connection is preferably implemented by arranging the cable end connection which is readied for that purpose in an injection mold which suitably encloses same.

It will be appreciated that the above-described embodiments of the invention have been set forth solely by way of example and illustration of the principles thereof and that various other modifications and alterations may be made therein without thereby departing from the spirit and scope of the invention.

What is claimed is:

1. A measuring cable travel sensor comprising
    a housing which at least partially comprises an at least substantially straight profile portion of uniform cross-section in its longitudinal direction,
    a cable drum,
    means rotatably mounting the cable drum in the housing,
    a measuring cable adapted to be wound on to and unwound from the cable drum upon rotational movement thereof,
    a spring engaging the cable drum and operable to urge it in the winding-on direction, and a rotary angle sensor for the drum, the cable drum, the spring and the rotary angle sensor being arranged in substantially coaxial relationship and the axial direction thereof extends transversely with respect to said longitudinal direction of the housing profile portion, said profile portion having a limb and said axial direction passing through said limb.

2. A measuring cable travel sensor as set forth in claim 1 and including a shaft on which said cable drum, said spring and said rotary angle sensor are arranged in said substantially coaxial relationship.

3. A measuring cable travel sensor as set forth in claim 1 wherein said profile portion is a plate-shaped profile portion.

4. A measuring cable travel sensor as set forth in claim 1 wherein said profile portion is an L-shaped profile portion.

5. A measuring cable travel sensor as set forth in claim 1 wherein said profile portion is a C-shaped profile portion.

6. A measuring cable travel sensor as set forth in claim 1 wherein said profile portion is a box profile portion.

7. A measuring cable travel sensor as set forth in claim 6 wherein said box profile portion is a rectangular box profile portion.

8. A measuring cable travel sensor as set forth in claim 1 wherein said profile portion is a double-box profile portion.

9. A measuring cable travel sensor as set forth in claim 8 wherein said double box profile portion is a rectangular double-box profile portion.

10. A measuring cable travel sensor as set forth in claim 1 wherein said profile portion additionally includes an integral base plate which projects outwardly laterally at least at one side.

11. A measuring cable travel sensor as set forth in claim 1 wherein said profile portion comprises plastic material.

12. A measuring cable travel sensor as set forth in claim 1 wherein said profile portion comprises light metal.

13. A measuring cable travel sensor as set forth in claim 1 wherein said profile portion comprises light alloy.

14. A measuring cable travel sensor as set forth in claim 1 wherein said profile portion comprises a steel alloy.

15. A measuring cable travel sensor as set forth in claim 1 and further including a spring shell portion accommodating said spring, the spring shell portion being produced by a deformation shaping operation.

16. A measuring cable travel sensor as set forth in claim 15 wherein said spring shell portion is a deep-drawn component.

17. A measuring cable travel sensor as set forth in claim 15 wherein said spring shell portion is a bent sheet metal component.

18. A measuring cable travel sensor as set forth in claim 1 and further including a sensor shell portion accommodating said rotary angle sensor, said sensor shell portion being produced by a deformation shaping operation.

19. A measuring cable travel sensor as set forth in claim 1 and further including a spring shell portion accommodating said spring and substantially comprising a further straight profile portion of a cross-section which is uniform in its longitudinal direction.

20. A measuring cable travel sensor as set forth in claim 19 wherein said further profile portion is formed by a part of an extrusion.

21. A measuring cable travel sensor as set forth in claim 1 wherein said profile portion of said housing is a double-box profile portion comprising a hollow space serving as a receiving region for accommodating the cable drum and a second hollow space serving as a receiving region for accommodating the spring.

22. A measuring cable travel sensor as set forth in claim 1 and further including a brake operable to control the movement of the cable in relation to the cable drum.

23. A measuring cable travel sensor as set forth in claims 22 wherein said brake is operable to act on said cable drum when said cable is being wound on to said cable drum.

24. A measuring cable travel sensor as set forth in claim 22 wherein said brake is operable to act on said spring when said cable is being wound on to said cable drum.

25. A measuring cable travel sensor as set forth in claim 22 wherein said brake is a fluid brake.

26. A measuring cable travel sensor as set forth in claim 22 wherein said brake is an air brake.

27. A measuring cable travel sensor as set forth in claim 22 wherein said brake is an eddy current brake.

28. A measuring cable travel sensor as set forth in claim 22 wherein said brake is a magnetic brake.

29. A measuring cable travel sensor as set forth in claim 1 wherein said cable drum has a winding surface and wherein at least the winding surface of said cable drum comprises an elongate straight profile portion of uniform cross-section in its longitudinal direction.

30. A measuring cable travel sensor as set forth in claim 29 wherein said winding surface comprises a round tubular profile portion having ends, the cable drum further including a contact disk disposed at each of said ends and projecting radially therebeyond, each said disk having a central hub means for supporting said cable drum on a shaft means.

31. A measuring cable travel sensor as set forth in claim 1 wherein said cable drum comprises a plurality of individual parts which are joined together.

32. A measuring cable travel sensor as set forth in claim 31 wherein said parts are connected together by adhesive means.

33. A measuring cable travel sensor as set forth in claim 31 wherein said parts are connected together by soldering.

34. A measuring cable travel sensor as set forth in claim 31 wherein said parts are connected together by welding.

35. A measuring cable travel sensor comprising
a housing which at least partially comprises an at least substantially straight profile portion of uniform cross-section in its longitudinal direction,
a cable drum,
means rotatably mounting the cable drum in the housing,
a measuring cable adapted to be wound on to and unwound from the cable drum upon rotational movement thereof,
a spring engaging the cable drum and operable to urge it in the winding-on direction,
a rotary angle sensor for the drum,
the profile portion having at least a main limb and a secondary limb, said main limb being the limb of a profile portion with a longest extent transversely with respect to said longitudinal direction, and
said main limb being of an increased wall thickness in comparison with said secondary limb, for supporting said shaft.

36. A measuring cable travel sensor as set forth in claim 35 including bearing means for supporting said shaft in said portion of said main limb which is of increased wall thickness.

37. A measuring cable travel sensor comprising
a housing which at least partially comprises an at least substantially straight profile portion of uniform cross-section in its longitudinal direction,
a cable drum,
means rotatably mounting the cable drum in the housing,
a measuring cable adapted to be wound on to and unwound from the cable drum upon rotational movement thereof,
a spring engaging the cable drum and operable to urge it in the winding-on direction,
a rotary angle sensor for the drum, and
the profile portion having main limbs and longitudinal grooves extending in a longitudinal direction in said main limbs.

38. A measuring cable travel sensor as set forth in claim 37 wherein said longitudinal grooves are of an undercut cross-sectional configuration.

39. A measuring cable travel sensor as set forth in claim 37 wherein said longitudinal grooves are of a substantially Ω-shaped cross-sectional configuration.

40. A measuring cable travel sensor as set forth in claim 37 wherein the longitudinal grooves are provided in inside surfaces of said profile portion.

41. A measuring cable travel sensor as set forth in claim 37 wherein said profile portion has main limbs and secondary limbs and corner regions therebetween and including longitudinal grooves disposed in the proximity of said corner regions but not directly in said corners.

42. A measuring cable travel sensor as set forth in claim 37 wherein the profile portion has first and second mutually oppositely disposed limbs and wherein the longitudinal grooves are arranged in the limbs in opposite mirror-image relationship.

43. A measuring cable travel sensor comprising
a housing which at least partially comprises an at least substantially straight profile portion of uniform cross-section in its longitudinal direction,
a cable drum,
means rotatably mounting the cable drum in the housing,
a measuring cable adapted to be wound on to and unwound from the cable drum upon rotational movement thereof,
a spring engaging the cable drum and operable to urge it in the winding-on direction,
a rotary angle sensor for the drum, and
the profile portion being an extruded profile portion.

44. A measuring cable travel sensor comprising
a housing which at least partially comprises an at least substantially straight profile portion of uniform cross-section in its longitudinal direction,
a cable drum,
means rotatably mounting the cable drum in the housing,
a measuring cable adapted to be wound on to and unwound from the cable drum upon rotational movement thereof,
a spring engaging the cable drum and operable to urge it in the winding-on direction,
a rotary angle sensor for the drum,
said profile portion being a profile portion having a main limb having first and second sides,
the cable drum being arranged in a parallel relationship on the first side of said main limb,
said spring being arranged on the second side of said main limb,
and a spring shell portion accommodating said spring and carried on a surface of said main limb at said second side thereof.

45. A measuring cable travel sensor comprising
a housing which at least partially comprises an at least substantially straight profile portion of uniform cross-section in its longitudinal direction,
a cable drum,
means rotatably mounting the cable drum in the housing,
a measuring cable adapted to be wound on to and unwound from the cable drum upon rotational movement thereof,
a spring engaging the cable drum and operable to urge it in the winding-on direction,
a rotary angle sensor for the drum,
said profile portion being a box profile portion having a space therewithin and having main limbs,
said cable drum being disposed in an interior of said box profile portion between said main limbs, and
said spring having arranged on a side of the main limb remote from said cable drum in a spring shell portion carried on an outside surface of said main limb.

46. A measuring cable travel sensor comprising
a housing which at least partially comprises an at least substantially straight profile portion of uniform cross-section in its longitudinal direction,
a cable drum,
means rotatably mounting the cable drum in the housing,
a measuring cable adapted to be wound on to and unwound from the cable drum upon rotational movement thereof, a spring engaging the cable drum and operable to urge it in the winding-on direction, a rotary angle sensor for the drum, a sensor shell portion accommodating said rotary angle sensor, said sensor shell portion being produced by a deformation shaping operation, and said sensor shell portion being a deep-drawn component.

47. A measuring cable travel sensor comprising a housing which at least partially comprises an at least substantially straight profile portion of uniform cross-section in its longitudinal direction, a cable drum, means rotatably mounting the cable drum in the housing, a measuring cable adapted to be wound on to and unwound from the cable drum upon rotational movement thereof, a spring engaging the cable drum and operable to urge it in the winding-on direction, a rotary angle sensor for the drum, a sensor shell portion accommodating said rotary angle sensor, said sensor shell portion being produced by a deformation shaping operation, and said sensor shell portion being a bent sheet metal component.

48. A measuring cable travel sensor comprising a housing which at least partially comprises an at least substantially straight profile portion of uniform cross-section in its longitudinal direction, a cable drum, means rotatably mounting the cable drum in the housing, a measuring cable adapted to be wound on to and unwound from the cable drum upon rotational movement thereof, a spring engaging the cable drum and operable to urge it in the winding-on direction, a rotary angle sensor for the drum, a spring shell portion accommodating said spring and substantially comprising a further straight profile portion of a cross-section which is uniform in its longitudinal direction, and a longitudinal direction of said further profile portion constituting said spring shell portion extending coaxially with respect to an axial direction of the shaft and said further profile portion being a closed profile portion which being closed at an outer end by a cover means.

49. A measuring cable travel sensor comprising a housing which at least partially comprises an at least substantially straight profile portion of uniform cross-section in its longitudinal direction, a cable drum, means rotatably mounting the cable drum in the housing, a measuring cable adapted to be wound on to and unwound from the cable drum upon rotational movement thereof, a spring engaging the cable drum and operable to urge it in the winding-on direction, a rotary angle sensor for the drum, a spring shell portion accommodating said spring and substantially comprising a further straight profile portion of a cross-section which is uniform in its longitudinal direction, and a longitudinal direction of said further profile portion of said spring shell portion extending at least substantially parallel to a longitudinal direction of the profile portion of said housing and the profile portion of said spring shell portion being a substantially C-shaped profile portion having limbs which terminate freely and with which it being carried on a main limb of a profile portion of said cable drum.

50. A measuring cable travel sensor comprising a housing which at least partially comprises an at least substantially straight profile portion of uniform cross-section in its longitudinal direction, a cable drum, means rotatably mounting the cable drum in the housing, a measuring cable adapted to be wound on to and unwound from the cable drum upon rotational movement thereof, a spring engaging the cable drum and operable to urge it in the winding-on direction, a rotary angle sensor for the drum, and said profile portion having open sides and further including longitudinal cover means for closing said open sides.

51. A measuring cable travel sensor as set forth in claim 50 wherein said covers sealingly close said open sides.

52. A measuring cable travel sensor as set forth in claim 50 wherein said profile portion of said housing is an at least substantially C-shaped profile portion having three open sides and further including a C-shaped cover means of dimensions adapted to said C-shaped profile portion for closing same.

53. A measuring cable travel sensor as set forth in claim 52 wherein said cover is an extruded portion.

54. A measuring cable travel sensor as set forth in claim 50 and further including screw means connecting said cover means to said profile portion and being self-tappingly screwable into longitudinal grooves in said profile portion.

55. A measuring cable travel sensor as set forth in claim 50 further including screw means connecting said substantially C-shaped cover means to said profile portion and being self-tappingly screwable into longitudinal grooves in said profile portion.

56. A measuring cable travel sensor comprising a housing which at least partially comprises an at least substantially straight profile portion of uniform cross-section in its longitudinal direction, a cable drum, means rotatably mounting the cable drum in the housing, a measuring cable adapted to be wound on to and unwound from the cable drum upon rotational movement thereof, a spring engaging the cable drum and operable to urge it in the winding-on direction, a rotary angle sensor for the drum, and said housing profile portion having a secondary limb and further including a cable entry means extending through said secondary limb.

57. A measuring cable travel sensor comprising a housing which at least partially comprises an at least substantially straight profile portion of uniform cross-section in its longitudinal direction, a cable drum, means rotatably mounting the cable drum in the housing, a measuring cable adapted to be wound on to and unwound from the cable drum upon rotational movement thereof, a spring engaging the cable drum and operable to urge it in the winding-on direction, a rotary angle sensor for the drum, and said rotary angle sensor being disposed at a side of the cable drum that is remote from said spring.

58. A measuring cable travel sensor comprising a housing which at least partially comprises an at least substantially straight profile portion of uniform cross-section in its longitudinal direction, a cable drum, means rotatably mounting the cable drum in the housing, a measuring cable adapted to be wound on to and unwound from the cable drum upon rotational movement thereof, a spring engaging the cable drum and operable to urge it in the winding-on direction, a rotary angle sensor for the drum, and said spring being disposed between said cable drum and said rotary angle sensor.

59. A measuring cable travel sensor comprising a housing which at least partially comprises an at least substantially straight profile portion of uniform cross-section in its longitudinal direction, a cable drum, means rotatably mounting the cable drum in the housing, a measuring cable adapted to be wound on to and unwound from the cable drum upon rotational movement thereof, a spring engaging the cable drum and operable to urge it in the winding-on direction, a rotary angle sensor for the drum, a brake operable to control the movement of the cable in relation to the cable drum, said brake being a magnetic brake, and said profile portion of said cable drum including a part of an extrusion.

60. A measuring cable travel sensor comprising a housing which at least partially comprises an at least substantially straight profile portion of uniform cross-section in its longitudinal direction, a cable drum, means rotatably mounting the cable drum in the housing, a measuring cable adapted to be wound on to and unwound from the cable drum upon rotational movement thereof, a spring engaging the cable drum and operable to urge it in the winding-on direction, a rotary angle sensor for the drum, said cable drum having a winding surface and at least the winding surface of said cable drum including an elongate straight profile portion of uniform cross-section in its longitudinal direction, said winding surface including a round tubular profile portion having ends, the cable drum further including a contact disk disposed at each of said ends and projecting radially therebeyond, each said disk having a central hub means for supporting said cable drum on a shaft means, and said winding surface and said hub means being integrally formed by a part of a profile portion which integrally has a plurality of radially extending spokes between said winding surface and said central hub means.

61. A measuring cable travel sensor as set forth in claim 60 and further including first and second end contact disks mounted to said profile portion and projecting radially therebeyond to constitute the configuration of said cable drum.

62. A measuring cable travel sensor as set forth in claim 60 wherein said spokes are of the minimum possible mass.

63. A measuring cable travel sensor as set forth in claim 60 wherein components at the outer periphery of said cable drum are of the minimum possible mass.

* * * * *